US009338678B2

(12) United States Patent
Baillargeon

(10) Patent No.: US 9,338,678 B2
(45) Date of Patent: May 10, 2016

(54) PERFORMANCE MONITORING OF CONTROL AND PROVISIONING OF WIRELESS ACCESS POINTS (CAPWAP) CONTROL CHANNELS

(71) Applicant: Telefonaktiebolaget L M Ericsson (publ), Stockholm (SE)

(72) Inventor: Steve Baillargeon, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 14/017,950

(22) Filed: Sep. 4, 2013

(65) Prior Publication Data

US 2014/0105060 A1    Apr. 17, 2014

Related U.S. Application Data

(63) Continuation-in-part of application No. 13/902,162, filed on May 24, 2013.

(60) Provisional application No. 61/712,505, filed on Oct. 11, 2012.

(51) Int. Cl.
| | |
|---|---|
| H04L 12/26 | (2006.01) |
| H04W 24/06 | (2009.01) |
| H04W 8/24 | (2009.01) |
| H04W 84/12 | (2009.01) |

(52) U.S. Cl.
CPC ............... *H04W 24/06* (2013.01); *H04W 8/24* (2013.01); *H04W 84/12* (2013.01)

(58) Field of Classification Search
None
See application file for complete search history.

(56) References Cited

U.S. PATENT DOCUMENTS

| | | |
|---|---|---|
| 6,928,473 B1 | 8/2005 | Sundaram et al. |
| 7,457,868 B1 | 11/2008 | Guo |
| 7,835,290 B2 | 11/2010 | Song et al. |
| 2003/0023710 A1 | 1/2003 | Corlett et al. |
| 2003/0108033 A1* | 6/2003 | Raisanen et al. ............... 370/352 |
| 2004/0208165 A1 | 10/2004 | Cai et al. |
| 2007/0064673 A1* | 3/2007 | Bhandaru et al. ............. 370/351 |
| 2008/0037548 A1 | 2/2008 | Yi et al. |

(Continued)

OTHER PUBLICATIONS

Y. Shi et al.—Internet Engineering Task Force (IETF) (Request for Comments (RFC) 5833), Category: Informational, "Control and Provisioning of Wireless Access Points (CAPWAP) Protocol Base MIB", ISSN: 2070-1721, (May 2010) consisting of 73-pages.

(Continued)

*Primary Examiner* — Steven H Nguyen
(74) *Attorney, Agent, or Firm* — Christopher & Weisberg, P.A.

(57) ABSTRACT

A method and system for enabling collection of end to end performance information for a control and provisioning of wireless access points, CAPWAP, bi-directional control channel established between first and second CAPWAP nodes are disclosed. According to one aspect, the system provides a first CAPWAP channel endpoint in the first CAPWAP node configured to provide a first plurality of sequence numbers in request messages on the CAPWAP bi-directional control channel. A second CAPWAP channel endpoint in the second CAPWAP node is configured to send a second plurality of sequence numbers in CAPWAP response messages on the CAPWAP bi-directional control channel, in response to the request messages. The first and second plurality of sequence numbers enable determination of a first set of one-way performance data for each direction of the CAPWAP bi-directional control channel.

23 Claims, 16 Drawing Sheets

(56) References Cited

U.S. PATENT DOCUMENTS

| | | | |
|---|---|---|---|
| 2008/0076419 | A1 | 3/2008 | Khetawat et al. |
| 2008/0095068 | A1 | 4/2008 | Uysal |
| 2008/0170521 | A1 | 7/2008 | Govindan et al. |
| 2009/0141694 | A1 | 6/2009 | Shi |
| 2010/0118724 | A1 | 5/2010 | Hirsch et al. |
| 2010/0128770 | A1 | 5/2010 | Stanciu |
| 2010/0211675 | A1 | 8/2010 | Ainali et al. |
| 2010/0226278 | A1 | 9/2010 | Borsos et al. |
| 2011/0063988 | A1 | 3/2011 | Lee et al. |
| 2012/0026869 | A1 | 2/2012 | Wang et al. |
| 2012/0087235 | A1 | 4/2012 | Smith et al. |
| 2012/0122501 | A1 | 5/2012 | Lai |

OTHER PUBLICATIONS

P. Calhoun et al.—Network Working Group (Request for Comments (RFC) 5415), Category: Standards Track, "Control and Provisioning of Wireless Access Points (CAPWAP) Protocol Specification", (Mar. 2009) consisting of 155-pages.

K. Hedayat et al.—Network Working Group (Request for Comments (RFC) 5357), Category: Standards Track, "A Two-Way Active Measurement Protocol (TWAMP)", (Oct. 2008) consisting of 26-pages.

E. Rescorla et al.—Network Working Group (Request for Comments (RFC) 4347), Category: Standards Track, "Datagram Transport Layer Security", (Apr. 2006) consisting of 25-pages.

H. Schulzrinne et al.—Network Working Group (Request for Comments (RFC) 3550), Obsoletes: 1889, Category: Standards Track, "RTP: A Transport Protocol for Real-Time Applications", (Jul. 2003) consisting of 89-pages.

RTP Control Protocol dated Jun. 23, 2013, Retrieved from the Internet:< URL: http://en.wikipedia.org/wiki/RTCP> consisting of 4-pages.

International Search Report and Written Opinion dated Feb. 10, 2014 for International Application No. PCT/IB2013/058442, International Filing Date: Sep. 10, 2013 consisting of 10-pages.

NPL: Bernaschi et al.: "OpenCAPWAP: An open source CAPWAP implementation for the management and configuration of WiFi hot spots", Computer Networks, Elsevier Science Publishers B.V., Amsterdam, NL, vol. 53, No. 2, Feb. 13, 2009, pp. 217-230, XP025846109, ISSN: 1389-1286, DOI: 10.1016/J.Comnet.2008.09. 016 [retrieved on Oct. 4, 2008] p. 2, col. 1, p. 6, paragraph 5—p. 11, figures 1, 4, 5, 7 and 11 consisting of 14-pages.

1st Office Action dated Dec. 24, 2014, in U.S. Appl. No. 13/902,162, filed May 24, 2013 consisting of 40-pages.

G. Sadasivan et al.—Network Working Group (Request for Comments (RFC) 5470), Category: Informational, "Architecture for IP Flow Information Export", (Mar. 2009) consisting of 31-pages.

S. Shalunov et al.—Network Working Group (Request for Comments (RFC) 4656), Category: Standards Track, "A One-way Active Measurement Protocol (OWAMP)", (Sep. 2006) consisting of 56-pages.

3GPP TS 29.281 V11.5.0 3rd Generation Partnership Project; Technical Specification Group Core Network and Terminals; General Packet Radio System (GPRS) Tunnelling Protocol User Plane (GTPv1-U) (Release 11) (Dec. 2012) consisting of 27-pages.

3GPP TS 36.423 V11.3.0 (Dec. 2012) 3rd Generation Partnership Project; Technical Specification Group Radio Access Network; Evolved Universal Terrestrial Radio Access Network (E-UTRAN); X2 application protocol (X2AP) (Release 11) (Dec. 2012) consisting of 141-pages.

3GPP TS 36.413 V11.2.1 (Feb. 2013) 3rd Generation Partnership Project; Technical Specification Group Radio Access Network; Evolved Universal Terrestrial Radio Access Network (E-UTRAN); S1 Application Protocol (S1AP) (Release 11) (Feb. 2013) consisting of 272-pages.

David L. Mills—Network Working Group (Request for Comments (RFC) 1305), Obsoletes: RFC-1119, RFC-1059, RFC-958, "Network Time Protocol (Version 3) Specification, Implementation and Analysis", (Mar. 1992) consisting of 120-pages.

* cited by examiner

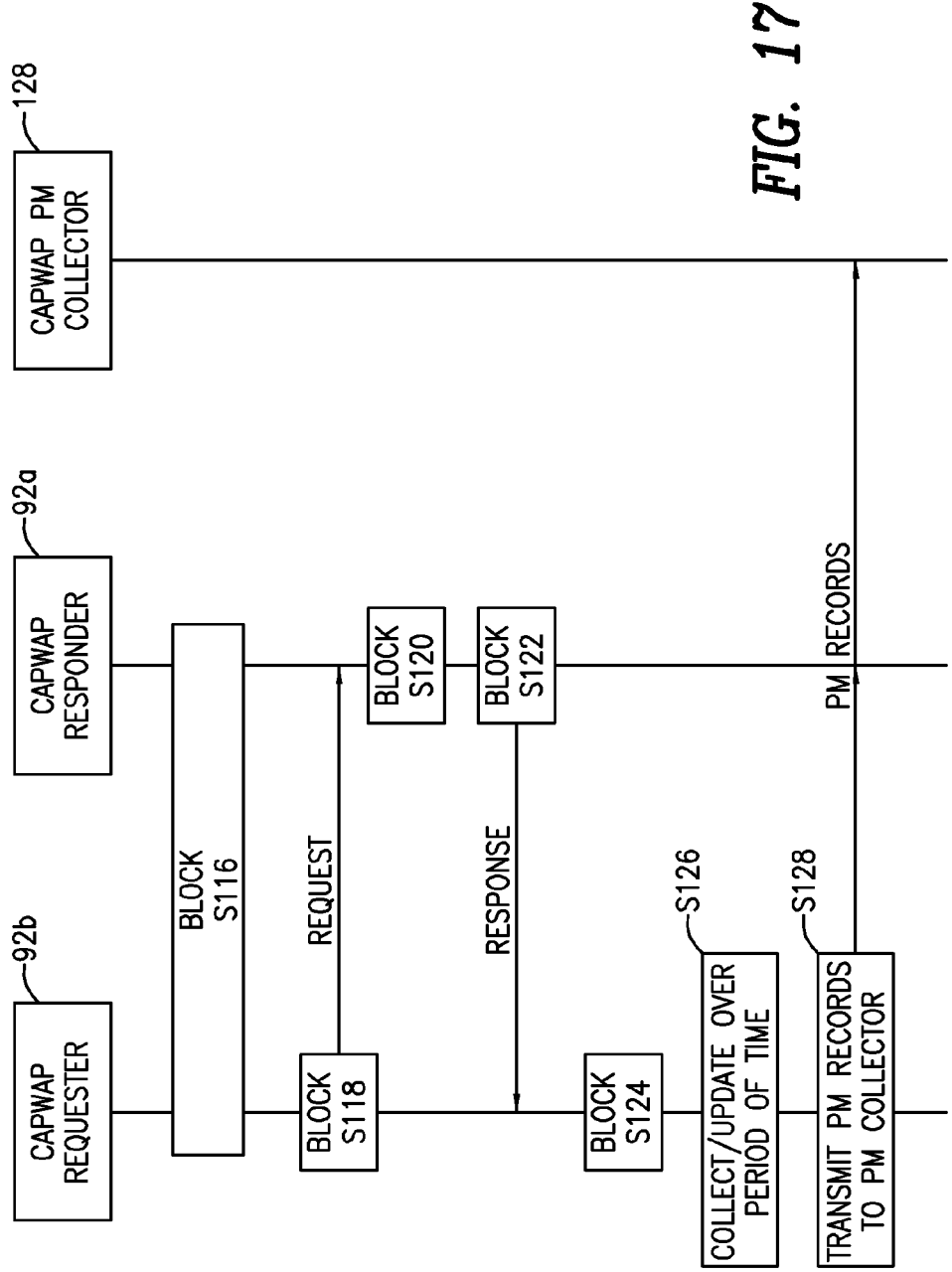

PERFORMANCE MONITORING OF CONTROL AND PROVISIONING OF WIRELESS ACCESS POINTS (CAPWAP) CONTROL CHANNELS

CROSS-REFERENCE TO RELATED APPLICATION

This application is a continuation-in-part-of U.S. patent application Ser. No. 13/902,162, filed May 24, 2013, entitled GENERAL PACKET RADIO SERVICE TUNNEL PERFORMANCE MONITORING, which claims priority to U.S. Provisional Patent Application Ser. No. 61/712,505, filed Oct. 11, 2012, entitled METHOD AND SYSTEM FOR GTP-U TUNNEL PERFORMANCE MONITORING, the entirety of which both are incorporated herein by reference.

TECHNICAL FIELD

The present invention relates generally to a general packet radio system, GPRS, tunneling protocol user (GTP-U) and control and provisioning of wireless access points (CAPWAP) performance monitoring and more particularly to monitoring the end-to-end performance of a GTP-U tunnel, CAPWAP data channel and CAPWAP control channel, over an Internet protocol (IP) network.

BACKGROUND

The general packet radio service (GPRS) is a packet oriented mobile data service for cellular communications systems, such as the global system for mobile communications (GSM), wideband code division multiple access (WCDMA), long term evolution (LTE) and wireless local area network (WLAN). A general packet radio system (GPRS) tunneling protocol user (GTP-U) node supports one or more GTP-U endpoints. Each pair of GTP-U endpoints is known as a GTP-U path which carries multiple GTP-U tunnels. GTP-U tunnels carry GTP-U data packets (also known as G-PDUs) between a pair of GTP-U tunnel endpoints. A tunnel endpoint is identified by a tunnel identifier, e.g., tunnel endpoint identifier (TEID).

A TEID identifies a unicast or multicast GTP-U tunnel endpoint in the receiving GTP-U node for a given GTP-U endpoint. The TEID is included in the GTP header of the G-PDU. The receiving end of a unicast GPRS tunneling protocol, GTP, tunnel assigns the TEID value that the transmitting end should use. The transmitting end of a multicast GTP tunnel assigns the TEID value the receiving end should use. The TEID values are exchanged between tunnel endpoints using control plane messaging.

The control plane procedures to setup a GTP-U tunnel are defined in protocols such as GTP-C, Radio Access Network Application Part (RANAP), S1-Application Protocol (S1-AP), X2 Application Protocol (X2-AP) and M3 Application Protocol (M3AP).

FIGS. 1 and 2 show a known GPRS 10 which includes three GTP-U nodes 12a, 12b and 12c (referred to collectively herein as "GTP-U nodes 12") that are connected by an Internet Protocol (IP) network 18. Each GTP-U node acts as a sender and a receiver of G-PDUs. FIG. 1 shows a unicast G-PDU being sent between GTP-U nodes 12c and 12a. FIG. 2 shows the same known GPRS 10 with the three GTP-U nodes 12a, 12b and 12c connected by the Internet network 18. In FIG. 2, a multicast G-PDU is being sent from GTP-U node 12a to GTP-U node 12b and to GTP-U node 12c.

Active IP probe based sampling of the IP path carrying the GTP-U tunneled traffic is currently used as a methodology for estimating the end-to-end state and performance of the unicast subscriber connection across the IP network. However, active IP probe based sampling does not measure the actual packet delay, packet delay variation and packet loss encountered by the user traffic carried on unicast GTP-U tunnels. The same problem exists for multicast GTP-U tunnels. Active IP probe based sampling, like the One-Way Active Measurement Protocol (OWAMP) and Two-Way Active Measurement Protocol (TWAMP), only provide a rough estimate of the performance perceived by the aggregated set of GTP-U tunnels on a given path.

The Internet engineering task force (IETF) standard body has defined an IP flow information export (IPFIX) architecture and protocol for selective monitoring of IP flows passing through an observation point and the export of measured IP flow information. IPFIX does not address the selective monitoring of GTP-U tunnels. IP flow information export does not provide the required granularity and depth of information to properly monitor the performance of a specific GTP-U tunnel. Furthermore, IPFIX is not designed to provide path performance statistics like end-to-end packet delay and packet loss. Such statistics are useful for characterizing tunnel performance.

Carrier-grade WLAN networks are implemented using Access Points (APs) and Access Controllers (ACs). The APs are distributed small cell nodes responsible for providing 802.11 radio services to users and subscribers in outdoor and/or in-door Wi-Fi coverage areas. The APs communicate with one or more Access Controllers (ACs) over a backhaul network. The backhaul network can be an IPv4 network, an IPv6 network, an Ethernet LAN network, a wireless mesh network or any other mix of wired or wireless Layer 2 (L2) technologies including a very high bit rate digital subscriber line/asymmetric digital subscriber line (VDSL/ADSL) and cable modem. The AC manages the control and data traffic from a group of APs. The AC improves Wi-Fi services delivery in large venues and enterprises, as well as small to medium sized businesses and 3G/4G offload scenarios. The AC provides a single point of management and increased security by creating secure connections to each AP.

A communication protocol used between the AP and AC is the Control And Provisioning of Wireless Access Points (CAPWAP) protocol. The CAPWAP protocol is composed of two distinct user datagram protocol/Internet protocol (UDP/IP) flows: the CAPWAP control channel and the CAPWAP data channel.

The CAPWAP control channel requires that control messages be defined in pairs, consisting of both a Request and a corresponding Response message from the peer. Therefore, the CAPWAP control channel is referred to herein as a bi-directional control channel. Examples of CAPWAP control messages are:

Discovery Request/Response (request originates from AP)
Join Request/Response (request originates from AP)
Configuration Status Request/Response (request originates from AP)
Configuration Update Request/Response (request originates from AC)
Wireless Transaction Protocol (WTP) Event Request/Response (request originates from AP)
Change State Event Request/Response (request originates from AP)
Echo Request/Response (request originates from AP)
Image Data Request/Response (request originates from AP or AC)

Reset Request/Response (request originates from AC)
Primary Discovery Request/Response (request originates from AP)
Data Transfer Request/Response (request originates from AP or AC)
Clear Configuration Request/Response (request originates from AC)
Station Configuration Request/Response (request originates from AC).

Monitoring the performance of the CAPWAP control channel (separately from the CAPWAP data channel) is critical to the performance of a WLAN network. The CAPWAP control channel does not carry any user data but it is used for many vital Wi-Fi network functions such as discovery, request for service, keep-alive, configuration, radio statistics reporting, firmware/software management, alarm notification, etc.

Active IP probe based sampling of the paths carrying the CAPWAP control traffic can be used as a methodology for estimating the end-to-end state and performance of the CAPWAP control channels across the IP network. However active IP probe based sampling does not measure the actual control packet delay, control packet delay variation, control packet loss and control packet mis-ordering encountered by the CAPWAP control traffic. Active IP probe based sampling like the One-Way Active Measurement Protocol (OWAMP) and Two-Way Active Measurement Protocol (TWAMP) only provide a rough estimate of the performance perceived by the aggregated CAPWAP control traffic on a given direction of a path.

The Internet Engineering Task Force (IETF) standards body has defined an IP flow information export (IPFIX) architecture and protocol for selective monitoring of IP flows passing through an observation point and the export of measured IP flow information. IPFIX does not address the selective monitoring of CAPWAP control channels. IP flow information export does not provide the required granularity and depth of information to properly monitor the performance of a specific CAPWAP control channel. Furthermore, IPFIX is not designed to provide path or end-to-end connection performance statistics like end-to-end packet delay and packet loss.

The IETF standards body has defined an information management base (MIB) for the CAPWAP protocol. Unfortunately, it does not specify any CAPWAP channel endpoint statistics or counters. It also does not include any end-to-end CAPWAP control channel or flow performance statistics since the currently defined CAPWAP protocol version is not able to generate one-way or two-way channel performance metrics.

GTP-U connections and real time transport protocol (RTP) sessions are made of pairs of unidirectional GTP-U tunnels or RTP flows and the GTP-U/RTP. One-way measurement methods for one-way GTP-U tunnels and RTP flows are not applicable or sufficient to handle the monitoring of CAPWAP control channels since the CAPWAP control channel is a two-way signaling protocol.

SUMMARY

Methods and systems for enabling collection of end to end performance information for a Control And Provisioning of Wireless Access Points, CAPWAP, bi-directional control channel established between first and second CAPWAP nodes are disclosed. According to one aspect, the invention provides a first CAPWAP channel endpoint in the first CAPWAP node, configured to provide a first plurality of sequence numbers in request messages on the CAPWAP bi-directional control channel. A second CAPWAP channel endpoint in the second CAPWAP node is configured to send a second plurality of sequence numbers in response messages on the CAPWAP bi-directional control channel. The first and second plurality of sequence numbers enable determination of a first set of one-way performance data for each of two directions of the CAPWAP bi-directional control channel.

According to this aspect, in some embodiments, the first CAPWAP channel endpoint is further configured to provide a first plurality of exit timestamps in the request messages, receive the response messages from the second CAPWAP channel endpoint, and provide a first plurality of arrival timestamps in the response messages. The second CAPWAP channel endpoint is further configured to receive the request messages from the first CAPWAP channel endpoint, provide a second plurality of arrival timestamps in the received request messages and provide a second plurality of exit timestamps in the response messages. The first and second plurality of exit timestamps and arrival timestamps enable determination of a second set of one-way performance data for each direction of the CAPWAP bi-directional control channel. The second set of one-way performance data for a given direction may include at least one of one-way packet delay and packet delay variation statistics. In some embodiments, the response messages include the first and second plurality of sequence numbers. In some embodiments, the first set of one-way performance data for a given direction includes at least one of one-way packet loss, packet mis-ordering, and packet duplicate statistics. The first CAPWAP channel endpoint may be further configured to provide a request discriminator in a request message to selectively identify particular control messages to be performance monitored. In some embodiments, the system may further comprise a performance monitor, PM, collector node in communication with the first CAPWAP channel endpoint and configured to collect the first set of one-way performance data from the first CAPWAP channel endpoint. In this embodiment, the PM data may be contained in a CAPWAP control message when the first CAPWAP channel endpoint is a WiFi access point. In some embodiments, the first CAPWAP channel endpoint acts as one of a WiFi access point and a WiFi access controller. In some embodiments, the second CAPWAP channel endpoint acts as one of a WiFi access point and a WiFi access controller. In some embodiments, the response messages and corresponding second plurality of sequence numbers received from the second CAPWAP channel endpoint are contained in a table establishing delay and loss statistics for the CAPWAP bi-directional control channel.

According to another aspect of the invention, there is provided a system for enabling collection of end-to-end performance information for a Control And Provisioning of Wireless Access Points, CAPWAP, bi-directional control channel established between first and second CAPWAP nodes. The system includes a first CAPWAP channel endpoint in the first node configured to send a first plurality of sequence numbers in response messages on the CAPWAP bi-directional control channel. The response messages are sent in response to the received request messages. The first plurality of sequence numbers enables determination of a set of one-way performance data for a first direction of the CAPWAP bi-directional control channel.

According to this aspect, in some embodiments, the system further includes a second CAPWAP channel endpoint in the second CAPWAP node, the second CAPWAP channel endpoint configured to provide a second plurality of sequence numbers in request messages, the second plurality of sequence numbers enabling determination of a set of one-way performance data for a second direction of the CAPWAP bi-directional control channel. In some embodiments, the first CAPWAP channel endpoint is further configured to receive a request message from a remote, i.e., third CAPWAP channel endpoint, and to assign an arrival timestamp to the received request message. In some embodiments, the response messages further include an arrival timestamp, the arrival timestamp indicating a time at which the request message is received by the first CAPWAP channel endpoint. In some embodiments, the response messages further include an exit timestamp indicating a time at which the response message is transmitted by the first CAPWAP channel endpoint. In some embodiments, a sequence number indicates an order in which the response message is transmitted. In some embodiments, the second CAPWAP channel endpoint is one of a WiFi access point and a WiFi access controller.

According to another aspect of the invention, there is provided a method for collecting end-to-end performance information for a Control And Provisioning of Wireless Access Points, CAPWAP, bi-directional control channel established between first and second CAPWAP nodes. The method includes sending from a first CAPWAP channel endpoint of the first node outgoing request messages on the CAPWAP bi-directional control channel, the outgoing request messages having first sequence numbers. The method also includes sending from a second CAPWAP channel endpoint of the second CAPWAP node outgoing response messages on the CAPWAP bi-directional control channel, the outgoing response message having second sequence numbers. The response messages are sent in response to the request messages. The first and second sequence numbers enable determination of a first set of one-way performance data for each of two directions of the CAPWAP bi-directional control channel.

According to this aspect, in some embodiments, the method further includes providing via the first CAPWAP channel endpoint a first plurality of exit timestamps in the request messages. The first CAPWAP channel endpoint receives the response messages from the second CAPWAP channel endpoint and provides a first plurality of arrival timestamps for the received response messages. The second CAPWAP channel endpoint receives the request messages from the first CAPWAP channel endpoint and provides a second plurality of arrival timestamps for the received request messages. Also, the second CAPWAP channel endpoint provides a second plurality of exit timestamps in the response messages. The first and second plurality of exit timestamps and arrival timestamps enable determination of a second set of one-way performance data for each direction of the CAPWAP bi-directional control channel. In some embodiments, the second set of one-way performance data for a given direction includes at least one of one-way packet delay and packet delay variation statistics. In some embodiments, the response messages further include an arrival timestamp indicating a time at which a request message is received by the second CAPWAP channel endpoint. In some embodiments, the response messages further include an exit timestamp indicating a time at which a response message is transmitted by the second CAPWAP channel endpoint. In still other embodiments, at least one request message includes a request discriminator to selectively identify particular control messages to be performance-monitored. In yet other embodiments, the response messages include the first and second plurality of sequence numbers.

BRIEF DESCRIPTION OF THE DRAWINGS

FIG. 17 is a diagram showing relative timing of the process of FIG. 16 along with the collection and transmission of performance monitoring records to a performance monitoring collector.

DETAILED DESCRIPTION

Figure 1:
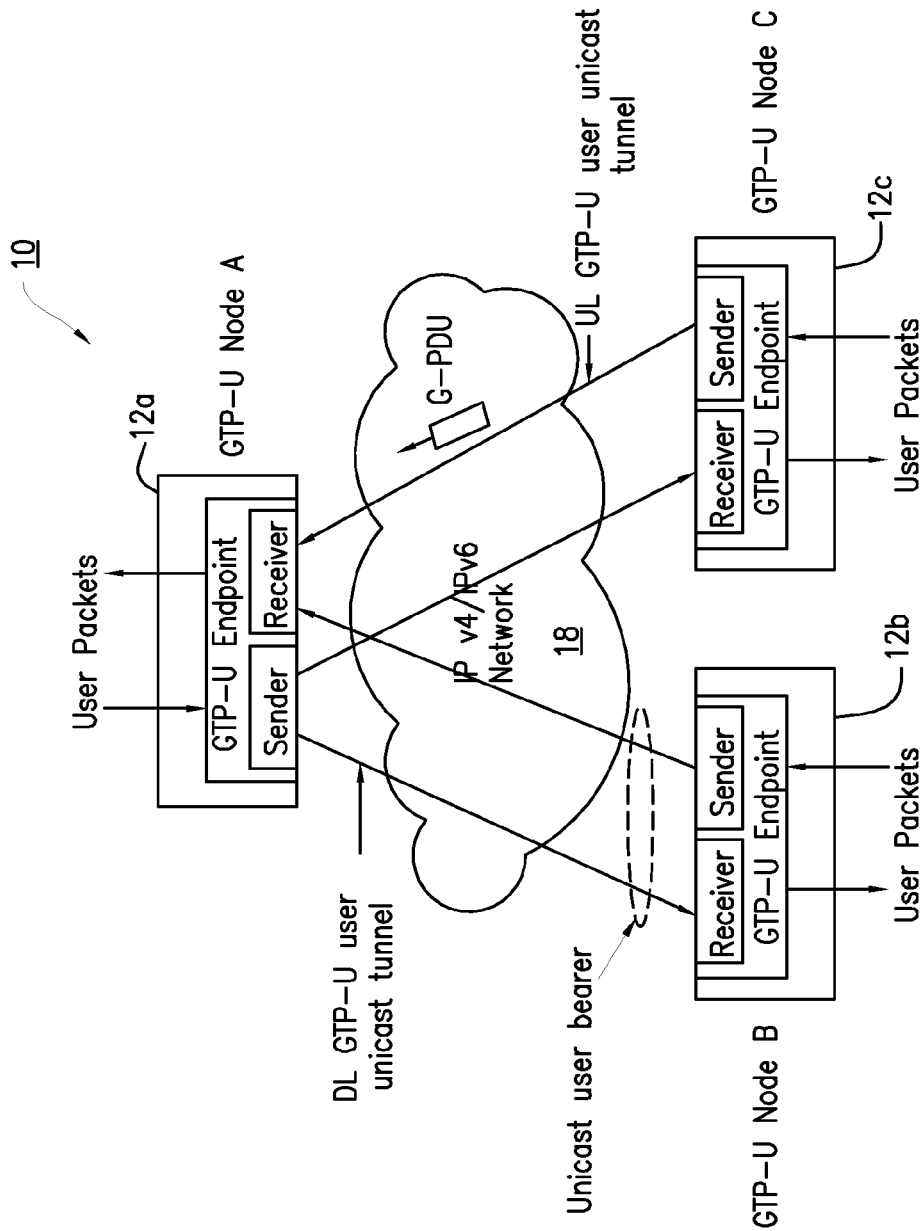
FIG. 1 is a diagram of a known network employing unicast communication between GTP-U endpoints.
Figure 2:
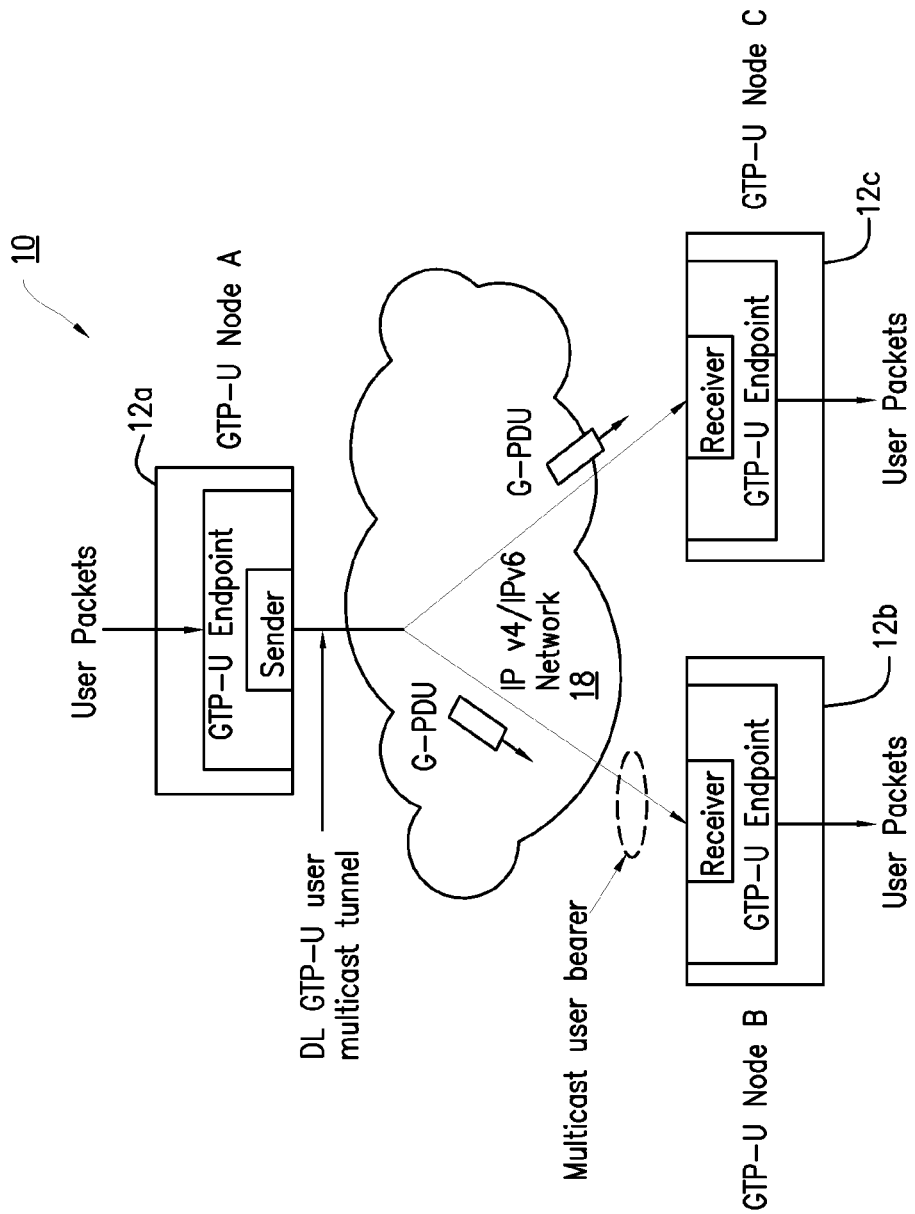
FIG. 2 is a diagram of a known network employing multicast communication between GTP-U end points.

Before describing in detail exemplary embodiments that are in accordance with the present invention, it is noted that the embodiments reside primarily in combinations of apparatus components and processing steps related to monitoring control channels in an IP network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein illustrate a method and system for enabling collection of end-to-end performance information for individual GTP-U tunnels established between GTP-U nodes in mobile networks for administrative, troubleshooting, quality-of-service (QoS) monitoring, user traffic profiling, attack/intrusion detection, and planning purposes. A GTP-U sender provides a sequence number and an exit timestamp for the purpose of monitoring the end-to-end performance of a unicast or multicast GTP-U tunnel. A GTP-U receiver provides an arrival timestamp and collects G-PDU performance data including outer G-PDU information, e.g. outer IP and Ethernet header fields, and inner G-PDU information, e.g. inner IP, ICMP, TCP, UDP and SCTP header fields. Also described is a method to transfer the G-PDU performance data to a performance data collector responsible for collecting, correlating, calculating and reporting the performance metrics of the end-to-end GTP-U tunnel or end-to-end user connection.

Embodiments allow each GTP-U tunnel to be monitored individually. The operator may decide to monitor the downlink direction of a specific unicast or multicast user bearer or may decide to monitor both directions of a unicast user bearer at the same time. The flexibility to monitor each individual GTP-U tunnel allows defining a performance monitoring (PM) solution applicable for both unicast and multicast bearers. It also allows controlling the GTP-U transmission overhead, GTP-U endpoint processing overhead and volume of GTP-U performance data. The following acronyms are used herein:

AP Access Point
AC Access Controller
ADSL Asymmetric digital subscriber line
CAPWAP Control and Provisioning of Wireless Access Points
CC Control Channel
DL Downlink
DSCP Diffserv Codepoint
DTLS Datagram Transport Layer Security
ECN Explicit Congestion Notification
eNB E-UTRAN Node B
GGSN Gateway GPRS Support Node
GPRS General Packet Radio System
GTP GPRS Tunneling Protocol
GTP-U GTP User
G-PDU GTP Protocol Data Unit
HeNB Home E-UTRAN Node B
HeNB GW Home eNB Gateway
IP Internet Protocol
IPv4 Internet Protocol Version 4
IPv6 Internet Protocol Version 6
IPFIX IP Flow Information Export
IMSI International Mobile Subscriber Identity
LAN Local Area Network
MBMS Multimedia Broadcast Multicast Service
MIB Management Information Base
OWAMP One-Way Active Measurement Protocol
QoS Quality of Service
PCP Priority Codepoint
PGW Packet Gateway
PM Performance Monitoring
RANAP Radio Access Network Application Protocol
RNC Radio Network Controller
RT Round Trip
SCTP Stream Control Transmission Protocol
SGSN Serving GPRS Support Node
SGW Serving Gateway
SN Sequence Number
TEID Tunnel Endpoint Identifier
TCP Transmission Control Protocol
TWAMP Two-Way Active Measurement Protocol
UDP User Datagram Protocol
UE User Equipment
UL Uplink
VDSL Very high bit rate digital subscriber line
WLAN Wireless Local Area Network
WTP Wireless Transaction Protocol The following terminology and definitions are used herein:

GTP-U node: A device having a processor, storage devices, I/O interfaces, and the like supporting one or more GTP-U endpoints. A GTP-U node can be an eNB, HeNB, HeNB GW, SGW, PGW, SGSN, GGSN, RNC, MBMS GW, WLAN AC or a proxy, for example.

GTP-U endpoint: A UDP/IP endpoint identified with an IP address and a UDP port number, e.g., port 2152. The GTP-U endpoint is responsible for receiving and/or sending G-PDUs and GTP-U signaling messages over one or more GTP-U tunnels.

GTP-U tunnel endpoint: A tunnel endpoint is identified with a TEID, an IP address and a UDP port number, e.g., usually port 2152.

TEID: A tunnel endpoint identifier (TEID) unambiguously identifies a unicast tunnel endpoint or multicast tunnel endpoint in the receiving GTP-U endpoint. TEID=0 is reserved for GTP-U signaling messages.

G-PDU: A GTP user plane message, which carries the original user packet. A G-PDU usually includes a GTP-U header, zero or more GTP-U extension headers and a user IP packet.

PM-capable GTP-U sender: A GTP-U endpoint responsible to forward and encapsulate the user packet into a G-PDU with a sequence number and exit time stamp. In the 2-point PM collection process, the PM-capable GTP-U sender is also responsible to generate G-PDU packet information and statistics, and export G-PDU performance monitoring (PM) records to the GTP-U PM collector. The PM-capable GTP-U sender is referred to herein as the GTP-U sender in this document.

PM-capable GTP-U receiver: A GTP-U endpoint responsible for receiving the G-PDU, tag it with an arrival time stamp, when necessary, and de-capsulate and forward the user packet towards its destination. The PM-capable GTP-U receiver is also responsible to generate G-PDU packet information and statistics, and export G-PDU performance monitoring (PM) records to the GTP-U PM collector. The PM-capable GTP-U receiver is simply referred to herein as the GTP-U receiver.

GTP-U PM collector: A device or function responsible for receiving and collecting the G-PDU performance monitoring records from one or more GTP-U nodes and produce performance metrics and reports for each tunnel or user connection.

G-PDU performance monitoring (PM) record: A G-PDU performance monitoring record is a message that contains G-PDU performance data like G-PDU packet information or GTP-U tunnel performance metrics and statistics about one or more G-PDUs for a specific GTP-U tunnel that was observed at the sending or receiving GTP-U tunnel endpoint.

A unicast user connection or bearer has one or more pairs of GTP-U unicast tunnels for point-to-point transmission in the uplink and downlink directions. A multicast user connection or bearer has a GTP-U multicast tunnel for point-to-multipoint transmission in the downlink direction. Multicast GTP-U tunnels are intended for Multimedia Broadcast Multicast Service (MBMS) or Evolved Multimedia Broadcast Multicast Service (eMBMS).

A GTP-U node can be an eNB, Home eNB (HeNB), SGW, PGW, MBMS GW, HeNB GW, RNC, SGSN or GGSN, WLAN AC or proxy.

Figure 3:
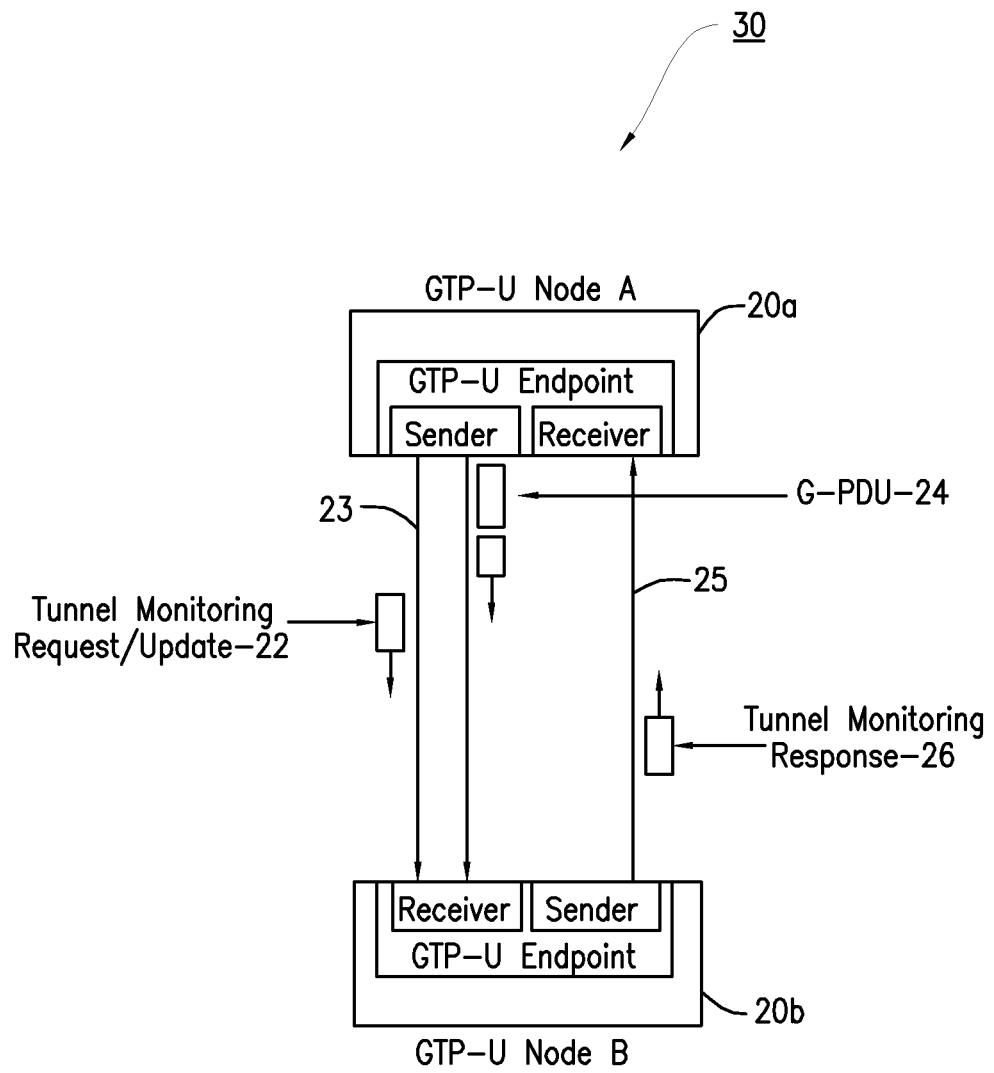
FIG. 3 is a diagram of a system for enabling collection of end-to-end performance information for GTP-U tunnels established between GTP-U nodes according to principles of the present invention.
Figure 4:
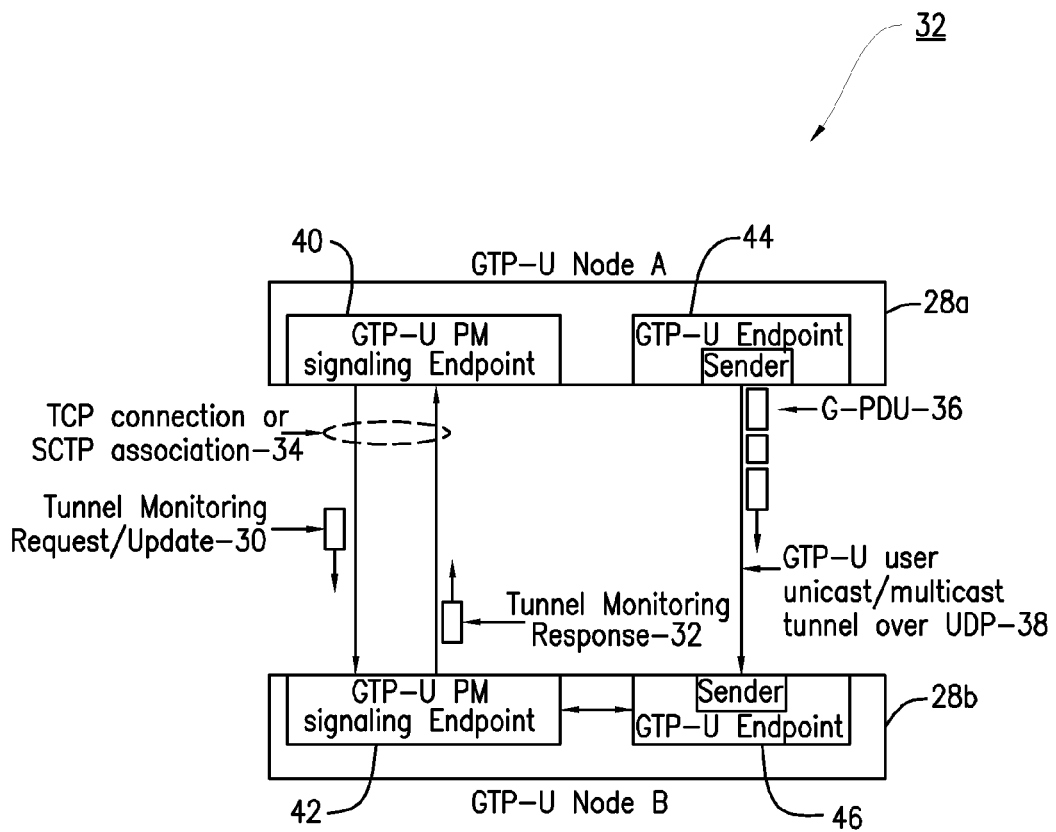
FIG. 4 is a diagram of a system for enabling collection of end-to-end performance information for GTP-U tunnels established between GTP-U nodes according to principles of the present invention.

Referring now to FIG. 3, there is shown an exemplary GPRS 30 which includes a GTP-U node 20a and a GTP-U node 20b (referred to collectively herein as "GTP-U nodes 20"). Each GTP-U node 20 is a sender and receiver of G-PDUs. In FIG. 3, a tunnel monitoring request/update 22 is sent from a transmitting node 20a to a receiving node 20b via a UDP link 23. A tunnel monitoring response 26 is sent from the receiving node 20b to the transmitting node 20a via a UDP link 25. Referring to FIG. 4, there is shown an exemplary GPRS 32 that includes a GTP-U node 28a and a GTP-U node 28b (referred to collectively herein as "GTP-U nodes 28").

In FIG. 4, a tunnel monitoring request 30 is sent from the transmitting node 28a to the receiving node 28b via a control channel 34 that may be a TCP or SCTP connection 34. A tunnel monitoring response 32 is sent over the control channel 34 from the receiving node 28b to the transmitting node 28a. G-PDUs 36 are transmitted over a separate channel such as a UDP channel 38. A difference between the embodiments of FIG. 3 and FIG. 4 is the manner in which identification of a tunnel node to be monitored is made. In the embodiment of FIG. 3, tunnel identification is performed in a data mode, whereas in the embodiment of FIG. 4, tunnel identification is performed in a control mode. Thus, each GTP-U node in FIG. 4 comprises signaling endpoints 40 and 42, and also comprises GTP-U endpoints 44 and 46. FIG. 3 shows that the control messages are exchanged in GTP-U signaling messages and transmitted over the network 18 using a high priority IP quality of service or DSCP. FIG. 4 shows that the control messages are exchanged over a separate control protocol running over a TCP connection or SCTP association, whereas FIG. 3 shows that the control messages and the data are both transmitted over a UDP connection. TCP and SCTP support reliable transport.

More specifically, in the data mode, the GTP-U sender locally decides when GTP-U performance monitoring capability begins and it is up to the GTP-U receiver to detect when GTP-U performance monitoring capability is required based on information present in the incoming G-PDUs. Such information may be a sequence number combined with a time stamp.

The GTP-U receiver stops monitoring a GTP-U tunnel when incoming G-PDUs no longer include the required information. In data mode, the operator remotely accesses the GTP-U receiver by way of a management interface to configure the behavior of the GTP-U performance monitoring capability, such as by specifying a G-PDU packet loss threshold. The operator may also enable or disable the GTP-U performance monitoring capability at the GTP-U sender for a specific user bearer using the international mobile subscriber identity (IMSI) of a UE.

In the control mode, the GTP-U sender 42 via a control function of the GTP-U sender 42, or an external control unit with a control function operating in conjunction with the GTP-U sender, and GTP-U receiver 44 exchange control messages to agree on the GTP-U performance monitoring capability for a specific GTP-U tunnel before the actual monitoring of the G-PDUs begins. When an external control unit is employed, the control unit may be responsible for signaling, trace and network management functions. The activation is prompted by a request message originating from the GTP-U sender 42 followed by a response message originating from the GTP-U receiver 44. The request message includes the TEID to monitor and may also include additional information about the expected performance monitoring behavior at the GTP-U receiver 44. This additional information may include a subscriber reference identifier generated by the GTP-U sender or network management node, a G-PDU loss threshold, initial sequence number, last sequence number or number of packets to monitor, DSCP, PCP, initial time to live and performance monitoring collection method. This information can also be provided in a G-PDU performance record sent to a G-PDU performance monitor collector.

Figure 5:
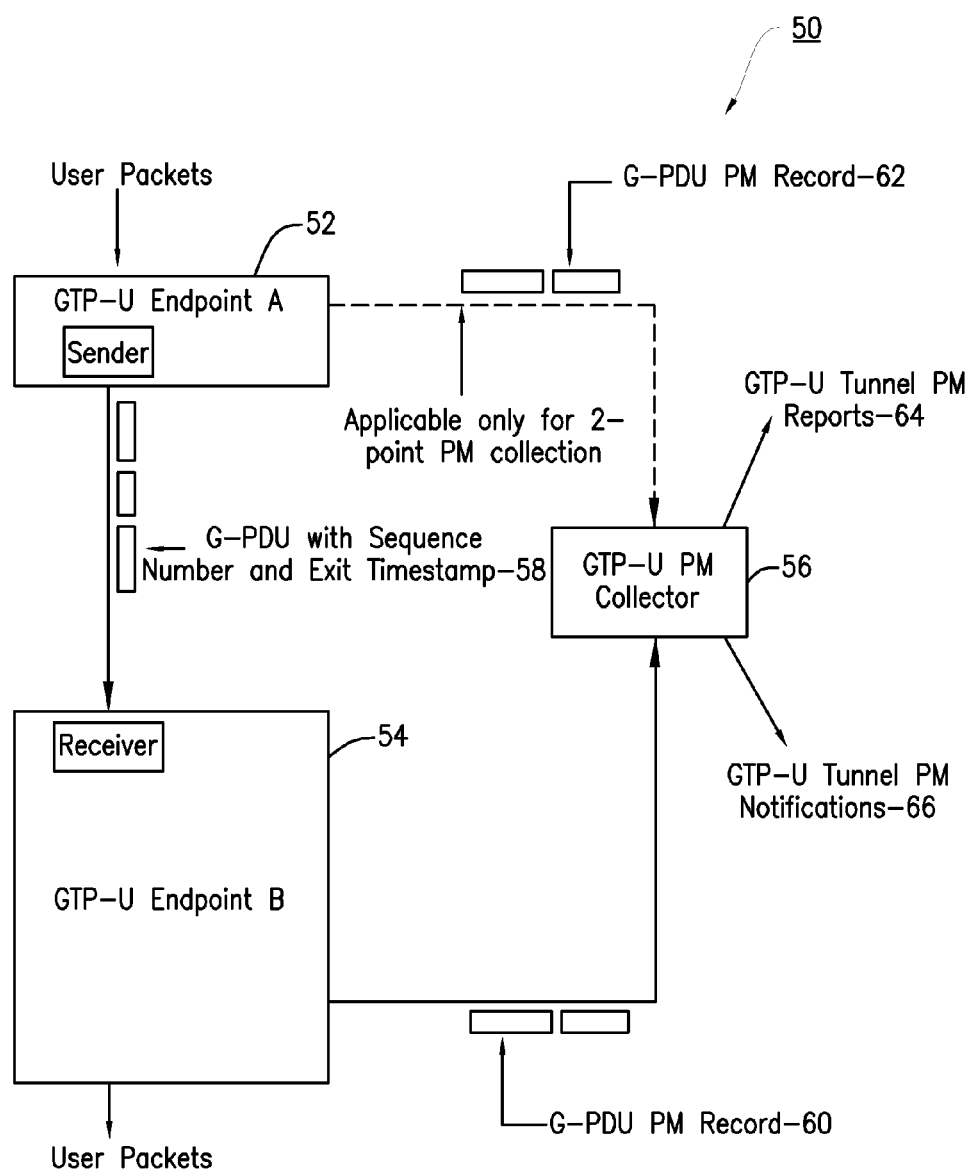
FIG. 5 is a diagram of a system for enabling collection of end-to-end performance information for GTP-U tunnels established between GTP-U nodes according to principles of the present invention.

FIG. 5 is a block diagram of an exemplary system 50 that illustrates a collection process for collecting data derived from performance monitoring of a tunnel. The GTP-U sender node 52 encapsulates each user packet into a G-PDU as defined by the applicable standard, such as TS 29.281 or TS 29.274. When GTP-U performance monitoring is activated for a tunnel, the GTP-U sender initiates a sequence counter for the corresponding outgoing GTP-U tunnel and includes a sequence number for each outgoing G-PDU. The GTP-U sender node 52 sends a G-PDU 58 with the sequence number and an exit time stamp to a GTP-U receiver node 54.

Thus, the GTP-U sender maintains a separate sequence number for each monitored GTP-U tunnel. The sequence number may be set to an initial value of zero upon the transmission of the first monitored G-PDU on the tunnel. The sequence number can be incremented by one for each subsequent G-PDU transmission on the tunnel. The sequence number can be carried in the GTP-U header as defined by the applicable standard. The sequence number can also be carried in a GTP-U extension header specifically reserved for the purpose of performance monitoring. If the sequence number is carried in the sequence number field defined in the GTP-U header, a reordering function at the GTP-U receiver node 54 may be disabled if not needed. This is because the sequence number defined in the current 3GPP specifications is intended to trigger the reordering of out of sequence packets at the remote peer when in-sequence delivery is required. The GTP-U sender 52 also generates an exit time stamp for each outgoing G-PDU.

The GTP-U receiver node 44 receives and encapsulates the user packet from each G-PDU received from the GTP-U sender node 42. When GTP-U performance monitoring is activated for a tunnel, the GTP-U receiver generates an arrival time for each incoming G-PDU and may include the arrival time stamp in the G-PDU performance data. The GTP-U receiver 54 may transfer the following G-PDU performance data in GTP-U performance monitoring records to a GTP-U performance monitoring collector 56. The performance data for a group of G-PDUs belonging to a specific tunnel may include, without limitation, one or more of the following:

Sub-IP (e.g. Ethernet) header fields
Outer and inner IP header fields
Outer transport (UDP) fields
Inner transport (UDP, TCP or SCTP) fields when applicable
Inner ICMP type and code when applicable
GTP-U header and extension header fields
Exit timestamp
Arrival timestamp when applicable
Associated TEID for the opposite direction of a unicast bearer
GTP-U node or interface identify or host name
User (UE) identity when known e.g. IMSI
Subscriber reference identifier when applicable
GTP-U sequence number of the first received G-PDU in the group
GTP-U sequence number of the last received G-PDU in the group The arrival timestamp of the first received G-PDU in the group
The arrival timestamp of the last received G-PDU in the group
Number of received G-PDUs
Number of received outer IP or Ethernet octets
Number of lost G-PDUs
Number of G-PDUs discarded locally
Lost G-PDU ratio
Number of duplicated G-PDUs
Duplicated G-PDU ratio
Number of reordered G-PDUs
Reordered G-PDU ratio
Minimum G-PDU delay and delay variation
Maximum G-PDU delay and delay variation
Median G-PDU delay and delay variation
Minimum G-PDU size
Maximum G-PDU size
Minimum TTL
Maximum TTL
Has DSCP changed
Has ECN changed
Has PCP changed
Number of received ICMP packets
Number of received user UDP packets
Number of received user SCTP packets
Number of received user TCP packets with SYC, FIN, RST, PSH, ACK and URG flags
Minimum TCP window size
Maximum TCP window Size At least some of the above-listed data is sent to the GTP-U performance monitor collector 56 in the form of performance monitoring records. The performance monitoring records 60 are transmitted to the performance monitor collector 56 when available or according to a schedule. The GTP-U performance monitor collector 56 may produce and provide GTP-U tunnel performance monitoring reports to a system administrator. In addition to receiving performance monitor data from the GTP-U receiver 54, the GTP-U performance monitor collector 56 may also receive G-PDU performance monitoring data 62 from the GTP-U sender 52. In some embodiments, the GTP-U performance monitor collector 56 may be separate from, or incorporated into, either the GTP-U sender 52 or the GTP-U receiver 54.

A G-PDU performance record contains G-PDU packet information and/or GTP-U tunnel performance metrics, which can include statistical performance data about one or more G-PDUs for a specific GTP-U tunnel. Data collection by the GTP-U performance monitor collector 46 can be obtained by a one-point GTP-U performance monitor collection method or a two-point GTP-U performance monitor collection method. In the one-point GTP-U performance monitor collection process, the data collection is only performed at the GTP-U receiver node 44 for each unidirectional tunnel.

For a bidirectional bearer, when GTP-U performance monitoring is activated in the both the downlink in the uplink directions, the GTP-U performance data is collected at both endpoints where each endpoint acts as a GTP-U receiver. In the one-point GTP-U performance monitor collection process, statistical analysis may be performed over a finite number of G-PDUs for a given GTP-U tunnel. The analysis may be performed in the GTP-U receiver unit 54 or at the GTP-U performance monitor collector 56. Therefore, the G-PDU performance records may include raw G-PDU packet information and/or GTP-U tunnel statistical performance metrics.

In the two-point GTP-U performance monitoring collection process, the data collection is done at the GTP-U sender 52 and at the GTP-U receiver 54 for each unidirectional tunnel. Thus, in the two-point GTP-U performance monitoring collection process, G-PDU performance monitoring records may be provided to the GTP-U performance monitor collector 46 from both the sending and receiving GTP-U units 52 and 54, respectively. The statistical metrics of a group of G-PDUs may be calculated after a configurable number of G-PDUs are received or after a configurable time period has elapsed.

A GTP-U performance record 60, 62 may be carried over TCP or SCTP transport protocol. A performance record can also be carried over UDP, including the use of GTP-U signaling messages to carry performance monitoring records back to the GTP-U node acting as the GTP-U sender node 42.

The GTP-U performance monitor collector 56 can be a dedicated device or a management node. It can also be an eNB, Home eNB (HeNB), SGW, PGW, MBMS GW, HeNB GW, RNC, SGSN, GGSN, WLAN AC or proxy. The GTP-U performance monitor collector collects the G-PDU performance records from one or more GTP-U nodes and correlates the records using the GTP-U tunnel characteristics. The GTP-U performance monitor collector is also responsible for correlating the records for unicast bearers for both uplink and downlink directions when applicable. The GTP-U performance monitor collector may also perform the statistical analysis and produce the performance metrics and reports 64 for each unicast or multicast tunnel. The performance report includes statistical properties for a specific tunnel or a specific user bearer, which may include a pair of tunnels.

When a performance degradation has been detected for a specific tunnel or user bearer, the GTP-U performance monitor collector 56 can be configured to send a notification or alarm 66 to a monitoring device such as an SNMP trap listener.

Figure 6:
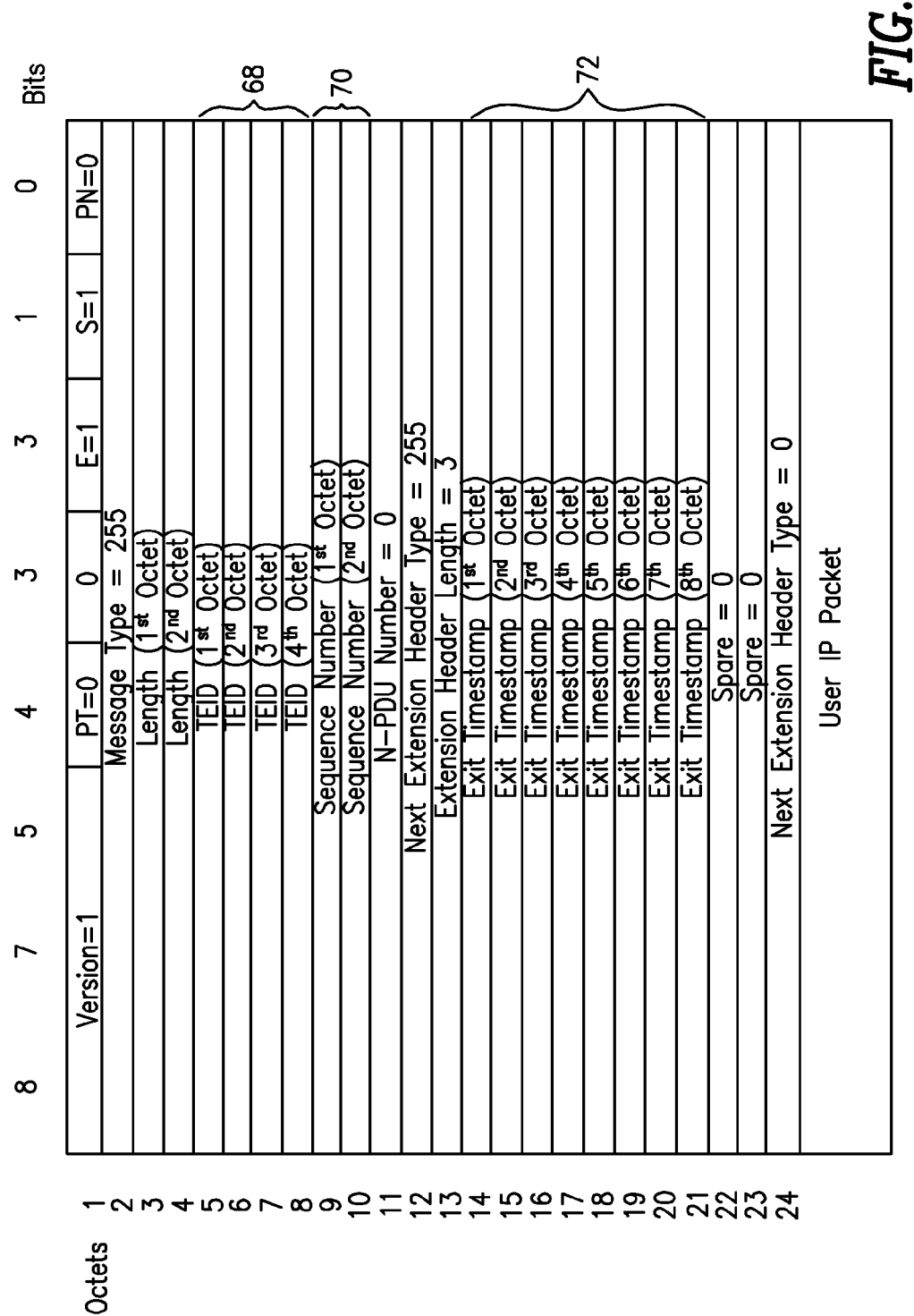
FIG. 6 illustrates one exemplary format of a G-PDU containing a sequence number, timestamp and TEID.

FIG. 6 illustrates one exemplary format of a G-PDU containing a sequence number, exit timestamp and TEID. The TEID 68 occupies 4 octets, the sequence number 70 occupies 2 octets and the exit timestamp occupies 8 octets 72. The Sequence Number flag (S) indicates the presence of a meaningful value of the sequence number field. When it is set to '1', the sequence number field is present, and should be interpreted. The Extension Header flag (E) indicates the presence of a meaningful value of the GTP-U extension header. When it is set to '1', an extension header is present, and should be interpreted. In the example of FIG. 6, the extension header includes a Next Extension Header Type equals to 255 specifying the presence of an exit timestamp in the GTP-U extension header. Other values for the Next Extension Header Type can be selected. Other implementations of the G-PDU may be envisioned.

Figure 7:
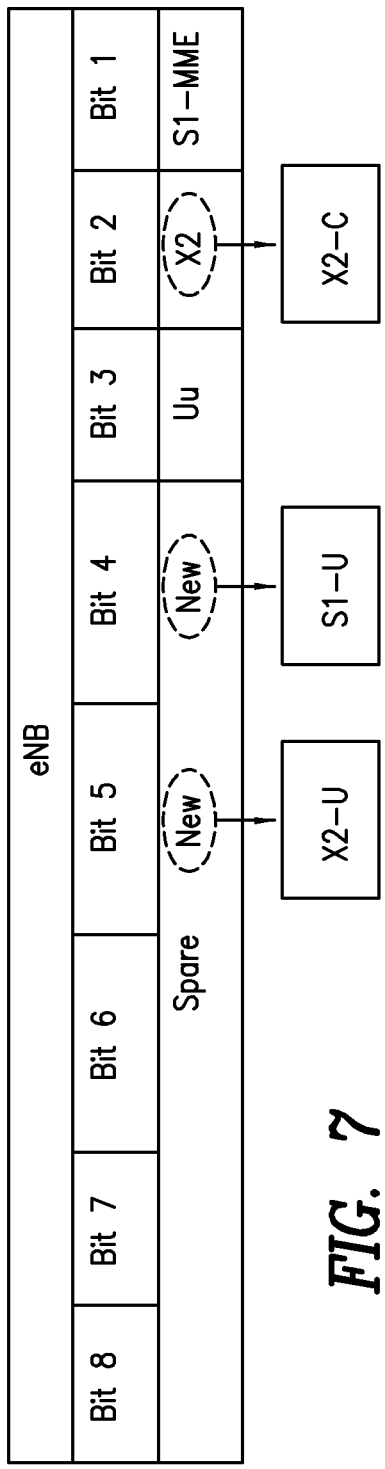
FIG. 7 is one exemplary format of a request message to activate tunnel monitoring on an eNodeB (eNB)

FIG. 7 shows one exemplary format of a request message to activate tunnel monitoring on an eNB. The request message is sent from a mobility management entity (MME) to an eNB. A logical one in bit 4 signals the eNB to activate monitoring of a GTP-U tunnel on the S1-U interface between the eNB and the SGW. A logical 1 in bit 2 signals the eNB to activate monitoring of a GTP-U control signal tunnel on an X2-C interface between the eNB and another eNB. A logical 1 in bit 6 signals the eNB to activate monitoring of a GTP-U data signal tunnel on an X2-U interface between the eNB and another eNB.

Figure 8:
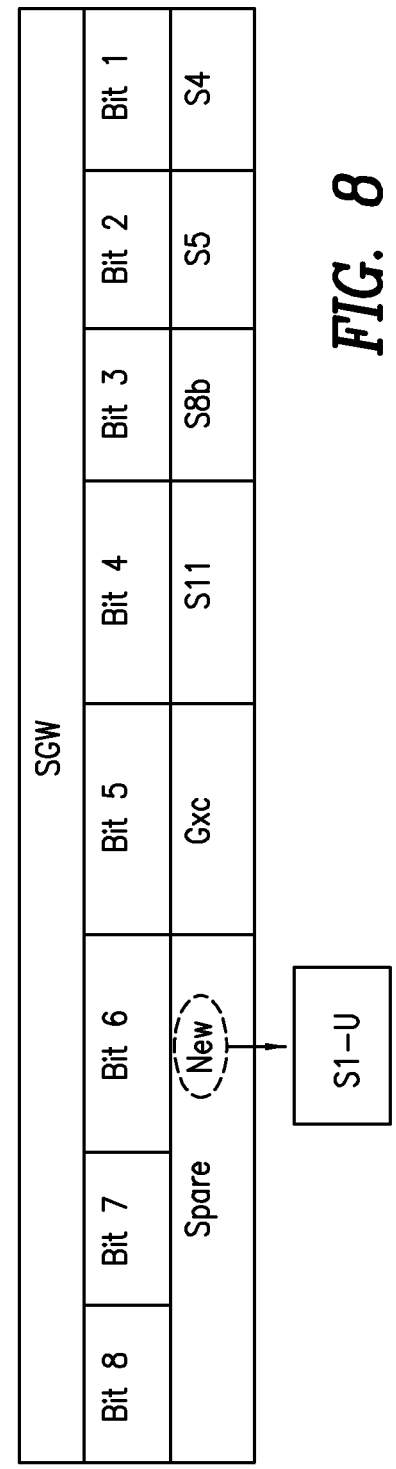
FIG. 8 is one exemplary format of a request message to activate tunnel monitoring on an serving gateway (SGW)

FIG. 8 shows one exemplary format of a request message to activate tunnel monitoring on an SGW. The request message is sent from the MME to the SGW. A logical 1 in bit 6 signals the SGW to activate monitoring of a GTP-U tunnel on the S1U interface between the SGW and an eNB.

Figure 9:
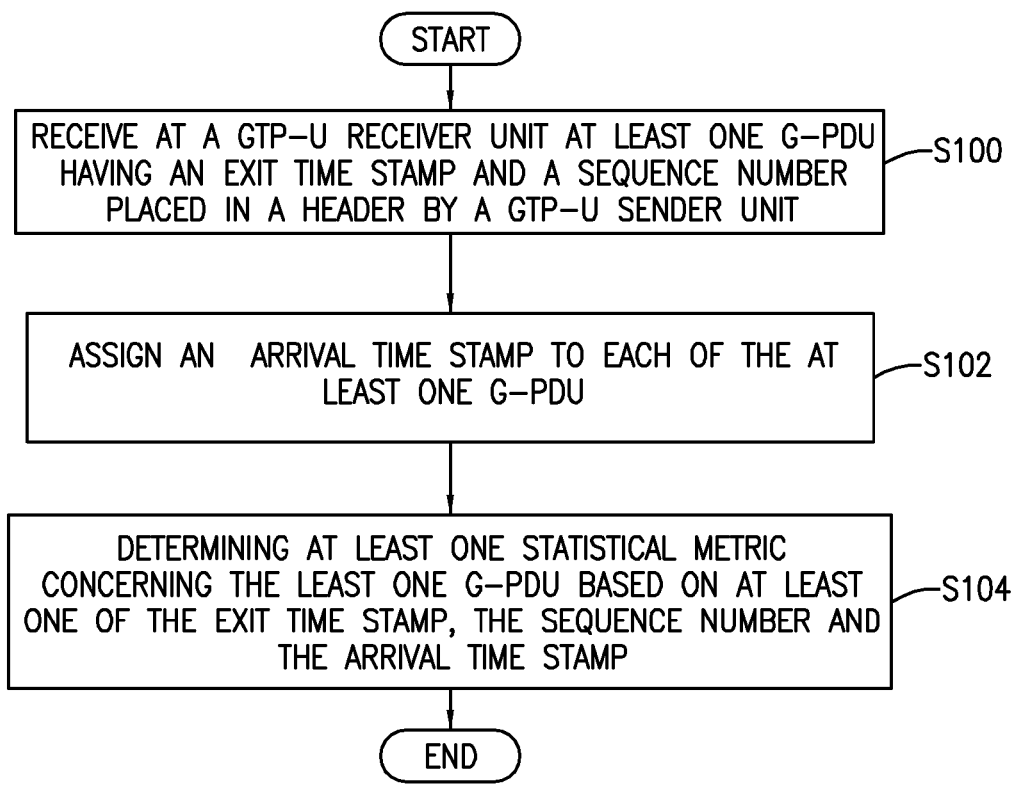
FIG. 9 is a flowchart of an exemplary process for determining at least one statistical metric concerning a G-PDU for a particular tunnel.

FIG. 9 is a flowchart of an exemplary process for determining at least one statistical metric concerning a G-PDU for a particular tunnel. The GTP-U receiver unit 54 receives from a GTP-U sender unit 54 at least one G-PDU having an exit time stamp and a sequence number placed in a header by a GTP-U sender unit 52 (block S100). An arrival timestamp is assigned by the GTP-U receiver unit 54 to a received G-PDU (block S102). At least one statistical metric concerning the G-PDU is determined at the GTP-U receiver unit 54 or the GTP-U performance monitor collector 56 based on at least one of the exit timestamp, sequence number and the arrival timestamp (block S104).

Figure 10:
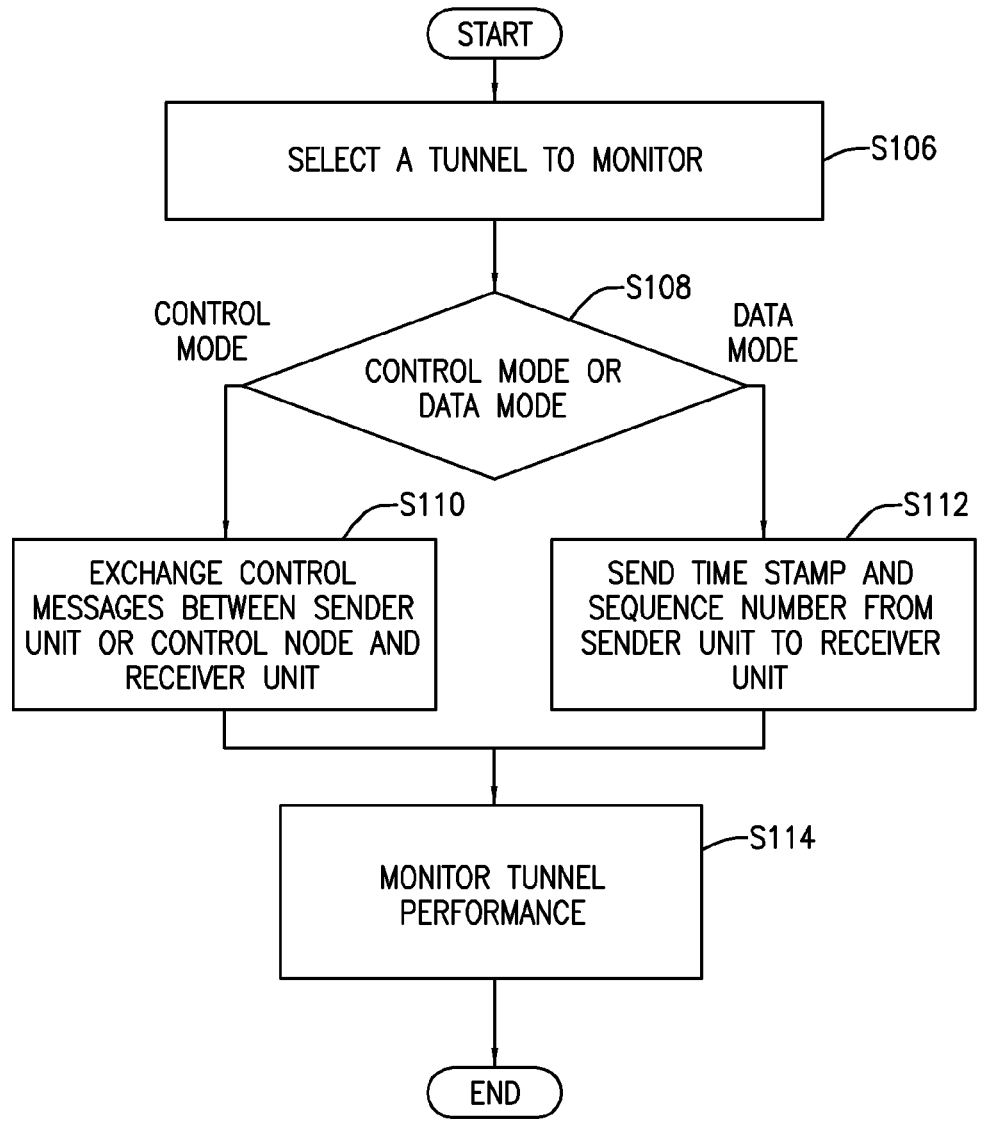
FIG. 10 is a flowchart of an exemplary process for initiating tunnel performance monitoring.

FIG. 10 is a flowchart of an exemplary process for initiating tunnel performance monitoring. A tunnel to monitor is selected (block S106), for example, by a system administrator. A determination is made by the system administrator whether the initiation will be performed using a control mode or a data mode (block S108). If the control mode is selected, control messages, which may include a TEID and subscriber reference identifier, are exchanged between the sender unit or a control node, operating in conjunction with the sender unit, and the receiver unit (block S110). If the data mode is selected, a timestamp and a sequence number is sent from the sender unit to the receiver unit (block S112). Upon initiation of the monitoring, a tunnel performance is monitored (block S114).

The principles of embodiments described above are applicable to Wi-Fi systems that include wireless access points. In particular, a Wi-Fi system that uses control and provisioning of wireless access points (CAPWAP) protocol may be configured to enable collection of end-to-end performance information.

Carrier-grade WLAN (Wireless Local Area Network) networks are made of Access Points (APs) and Access Controllers (ACs). The APs are distributed small-cell nodes responsible for providing 802.11 radio services to users and subscribers in outdoor and/or indoor Wi-Fi coverage areas. The APs communicate with one or more Access Controllers (ACs) over a backhaul network. The backhaul network can be an IPv4 network, an IPv6 network, an Ethernet LAN network, a wireless mesh network or any other mix of wired or wireless L2 technology, including very-high bit digital subscriber lines, asymmetric digital subscriber lines (VDSL/ADSL) and cable modems.

The AC manages the control and data traffic from a group of APs. The AC improves Wi-Fi services delivery in large venues and enterprises, as well as small to medium sized businesses and 3G/4G offload scenarios. The AC provides a single point of management and increased security by creating secure connections to each AP. The communication protocol between the AP and AC is the CAPWAP protocol. The CAPWAP protocol is composed of two distinct UDP/IP flows: the CAPWAP control channel and the CAPWAP data channel.

Figure 11:
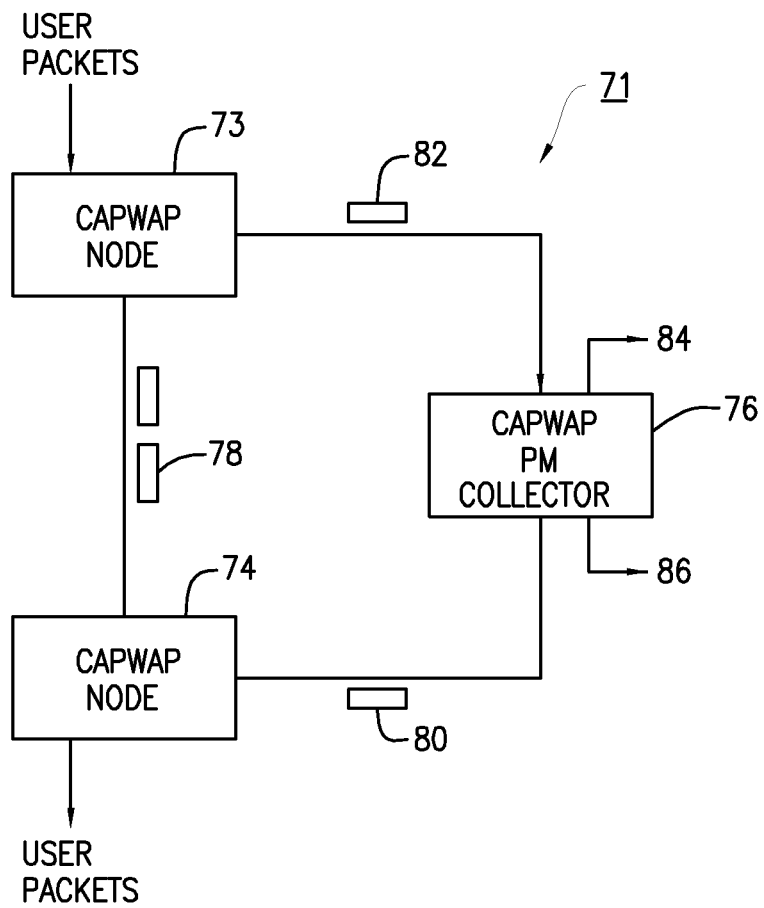
FIG. 11 is a diagram of an exemplary WiFi system for enabling collection of end-to-end performance information for data channels established between control and provisioning of wireless access points (CAPWAP) nodes according to principles of the present invention.

FIG. 11 is a block diagram of an exemplary system 71 that illustrates a collection process for collecting data derived from performance monitoring a CAPWAP data channel in a Wi-Fi system. A Wi-Fi data sender node 73, such as an access controller, encapsulates data packets 78 according to the CAPWAP protocol. User packets are received by the data sender node 73, processed and sent to a data receiver node 74. The data packets 78 are received by the CAPWAP data receiver node 74, such as an access point. When performance monitoring is activated for a data channel, the access controller 73 initiates a sequence counter for the corresponding data channel and includes a sequence number for each outgoing data packet 78. The data sender node 73 also generates an exit timestamp to stamp each outgoing data packets 78 with a time of transmission of the data packet. The data receiver node 74 may also forward the processed user data packets onward in the WiFi system.

Thus, the data sender node 73 maintains a separate sequence number for each monitored data channel. The sequence number may be set to an initial value of zero upon the transmission of the first monitored data packet on the data channel. The sequence number can be incremented by one for each subsequent transmission on the data channel.

The data receiver node 74 receives the data packets 78 from the data sender node 73. When performance monitoring is activated for a data channel, the data receiver node 74 generates an arrival time for each incoming data packet. The data receiver node 74 transfers data channel performance data and monitoring records 80 to a CAPWAP PM collector 76. Also, performance records 82 from the data sender node 73 may be sent to the collector 76. The collector 76 outputs data channel performance monitoring reports 84 and data channel performance monitoring notifications 86. Thus, operation of the system 71 is similar to operation of the system 50.

Embodiments described herein further provide a method to monitor the actual end-to-end connection performance for CAPWAP bi-directional control channels established between APs and ACs in WLAN networks for administrative, planning, troubleshooting, real-time performance degradation notification, mobility management and admission control purposes. Embodiments herein define a new CAPWAP protocol version with new fields in the CAPWAP header to enable end-to-end CAPWAP bi-directional control channel performance monitoring such as the one-way control packet delay, two-way control packet delay and one-way control packet loss. Embodiments also employ MIBs that provide one-way and two-way delay and loss statistics valid for the CAPWAP bi-directional control channel for the new protocol. Definitions of terms that relate to these embodiments are as follows.

CAPWAP node: A device (usually an AP or AC) supporting the CAPWAP protocol using IPv4 and/or IPv6 and configured with one or more CAPWAP channel endpoints.

CAPWAP bi-directional control channel: A bi-directional flow defined by an AC IP address, AP IP address, AC user datagram protocol (UDP) port, AP UDP port, and the transport-layer protocol (UDP or UDP-Lite) over which CAPWAP control packets are sent and received. An exemplary UDP port on the AC for the CAPWAP control channel may be UDP port 5246.

CAPWAP control packet: A packet carrying a CAPWAP signaling message (a request or a response to a request) sent over the CAPWAP bi-directional control channel. CAPWAP control packets are secured using Datagram Transport Layer Security (DTLS).

CAPWAP bi-directional control channel endpoint: A CAPWAP node endpoint identified by an IP address and a UDP port number. The CAPWAP control channel endpoint terminates or originates a CAPWAP control channel.

PM-capable CAPWAP bi-directional control channel requester: a CAPWAP channel endpoint that functions to send a CAPWAP request message with a request discriminator, request sequence number and/or request exit timestamp. The PM-capable CAPWAP control channel requester also functions to generate one-way and two-way statistics for requests originating from its channel endpoint and export control channel performance monitoring records to the CAP- WAP PM collector. The PM-capable CAPWAP control channel requester is simply referred to herein as the CAPWAP requester.

PM-capable CAPWAP control channel responder: a CAPWAP channel endpoint that functions to receive a CAPWAP request message and tag the CAPWAP request message with a request arrival timestamp. It also functions to transmit a CAPWAP response message in response to each CAPWAP request message the channel endpoint receives. The CAPWAP response message includes the request arrival timestamp, request TTL, response sequence number and response exit timestamp. The PM-capable CAPWAP control channel responder is simply referred to as the CAPWAP responder in this document.

CAPWAP PM collector: A device or function that receives and collects the CAPWAP control channel performance monitoring records from one or more CAPWAP bi-directional control channel requesters and produces performance reports and notifications for each CAPWAP bi-directional control channel.

CAPWAP performance monitoring (PM) record: A record containing performance information or notification about one or more CAPWAP bi-directional control channels that were observed at the CAPWAP bi-directional control channel requester.

Figure 12:
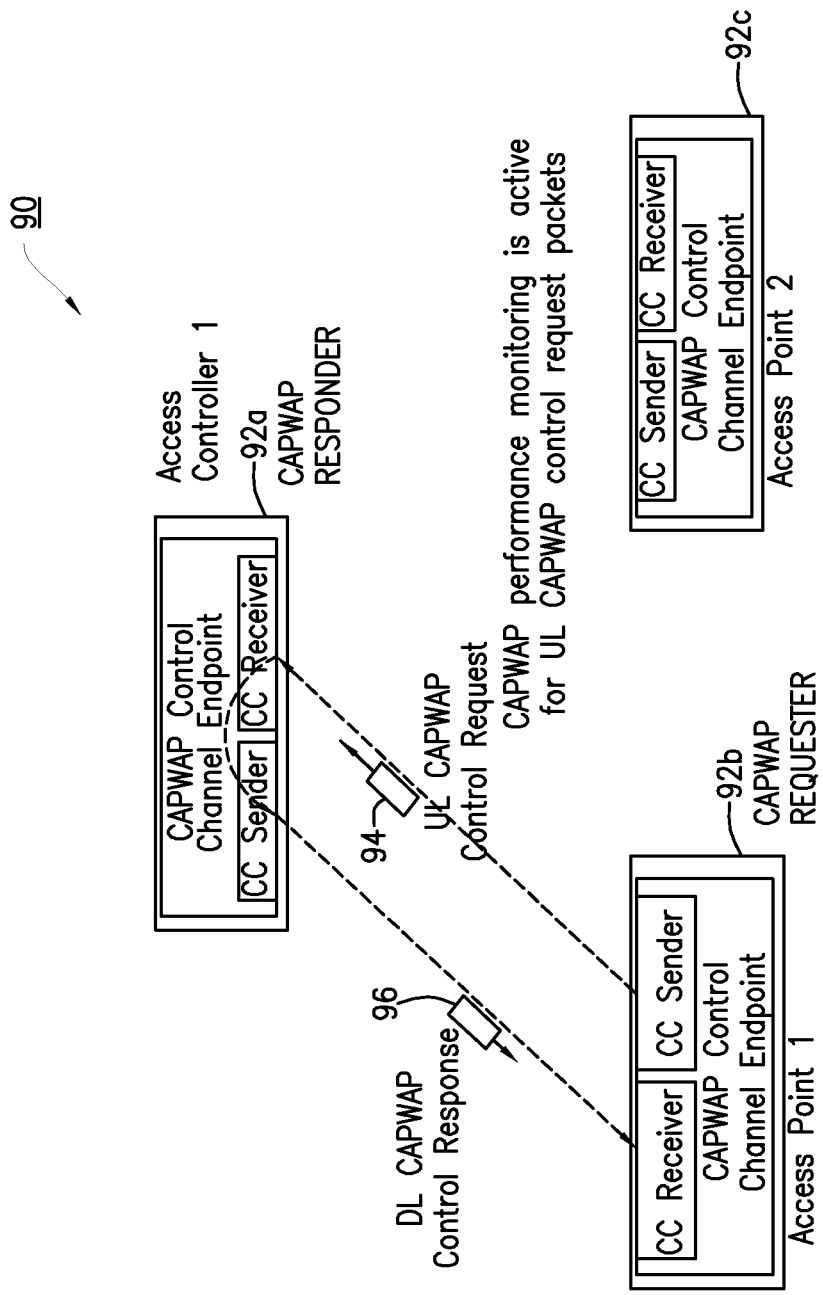
FIG. 12 is a block diagram of a Wireless Local Area Network (WLAN) network architecture constructed in accordance with principles of the present invention.

An exemplary block diagram of a WLAN network architecture 90 in which bi-directional control channel monitoring is implemented is described with reference to FIG. 12. FIG. 12 shows two APs 92b and 92c capable of communicating with one AC 92a over their respective CAPWAP bi-directional control channels. The APs 92b and 92c and the AC 92a, also referred to herein as channel endpoints, may include a processor and a memory for carrying out their respective functions. Additional APs are usually deployed in a typical WLAN network, and embodiments are not limited to only the two APs shown in FIG. 12. FIG. 12 shows an uplink request 94 and a downlink response 96 on a control channel when AP 92b is acting as a CAPWAP control channel requester. Similarly, the control channel supports a downlink request and an uplink response when AC 92a is acting as a CAPWAP control channel requester.

Thus, in accordance with one exemplary embodiment, a system for enabling collection of end-to-end performance information for CAPWAP bi-directional control channels established between first and second CAPWAP channel endpoints, 92a and 92b, is provided. A first CAPWAP channel endpoint 92b is configured to provide a first plurality of sequence numbers in request messages on the CAPWAP bi-directional control channel. A second CAPWAP channel endpoint 92a is configured to send a second plurality of sequence numbers in response messages on the CAPWAP bi-directional control channel in response to the request messages. Each of the request messages has a first sequence number and each of the response messages has the first sequence number and a second sequence number. The first and second sequence numbers enable determination of a first set of one-way performance data for each of the two directions of the CAPWAP bi-directional control channel. The first set of one-way performance data for a given direction includes at least one of one-way packet loss, packet mis-ordering, and packet duplicate statistics. These three measures of performance can be discerned from the sequence numbers. For example, a missing sequence number indicates a lost packet. Sequence numbers will not be in order in the case of packet mis-ordering. Duplicate sequence numbers indicate packet duplication.

In another embodiment, the first CAPWAP channel endpoint 92b is further configured to provide a first plurality of exit timestamps in the request messages, receive the response messages from the second CAPWAP channel endpoint 92a, and provide a first plurality of arrival timestamps for the received response messages. The second CAPWAP channel endpoint 92a may further be configured to receive the request messages from the first CAPWAP channel endpoint, provide a second plurality of arrival timestamps for the received request messages and provide a second plurality of exit timestamps in the response messages. The first and second plurality of exit timestamps and arrival timestamps enable determination of a second set of one-way performance data for each direction of the CAPWAP bi-directional control channel. The second set of one-way performance data for a given direction includes at least one of one-way packet delay and packet delay variation statistics. Packet delay can be determined by subtracting a value of an arrival timestamp inserted by the CAPWAP channel endpoint receiving a request message from a value of an exit timestamp inserted by the CAPWAP channel endpoint originating the request message. Variations in packet delay may be compiled to determine packet delay variation statistics such as mean packet delay and standard deviation from a mean packet delay value.

Some embodiments allow each CAPWAP bi-directional control channel or parts of a CAPWAP bi-directional control channel (specific set of request and response messages known as control procedures) to be monitored individually. For instance, an operator may decide to monitor the performance of a specific CAPWAP bi-directional control channel for CAPWAP request messages originating from the AP without monitoring the CAPWAP request messages originating from the AC. FIG. 12 shows that CAPWAP performance monitoring is activated on the AP1 CAPWAP bi-directional control channel. The flexibility to selectively monitor each individual CAPWAP bi-directional control channel endpoint allows for the reduction and better control of the transmission overhead, CAPWAP endpoint processing overhead and volume of PM records to create and process as compared with traditional monitoring environments.

The operator may be expected to remotely access the AP and/or AC via a management interface to activate or deactivate CAPWAP performance monitoring. The activation for the CAPWAP performance monitoring for the control channel can also be negotiated using a request message originating from the AP or AC followed by a response message originating from the remote peer. The request message may include information about the supported CAPWAP protocol version for the control channels, expected or supported PM record exporting behaviors, statistics to collect, start time, and number of control packets to monitor. An exemplary implementation is discussed below.

Figure 13:
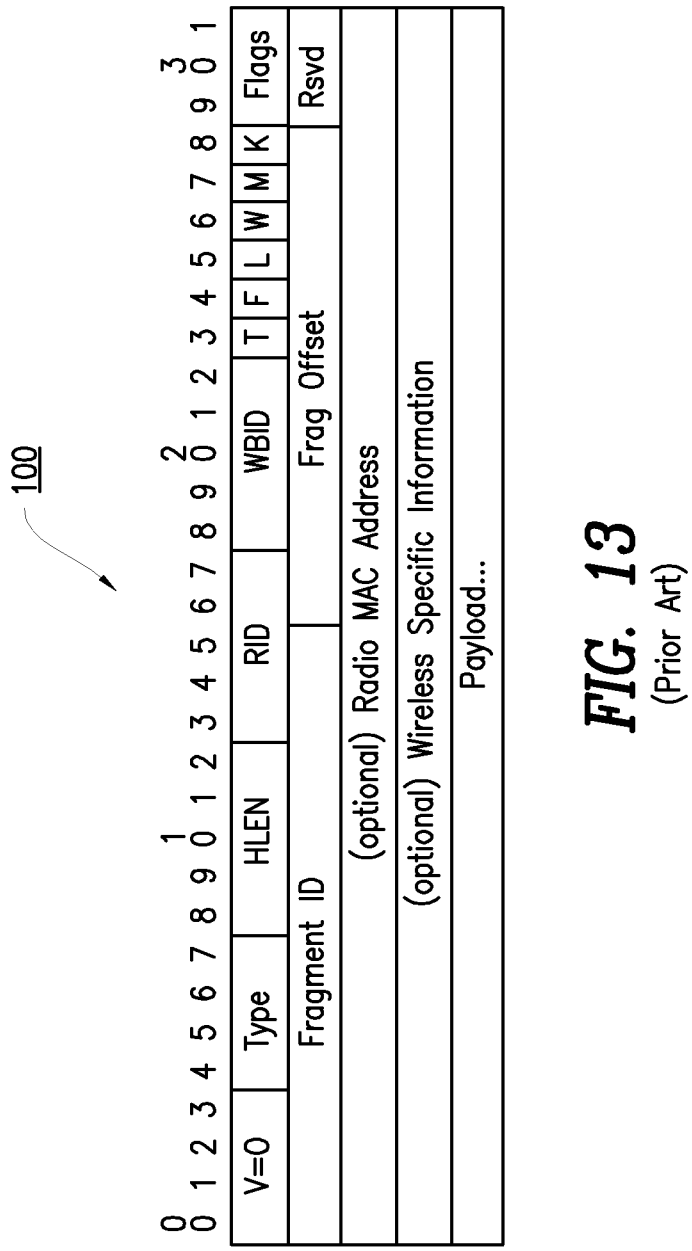
FIG. 13 is a known CAPWAP common header.

FIG. 13 illustrates a CAPWAP header 100 for a known CAPWAP protocol version 0. The header 100 is known as the CAPWAP common header. All CAPWAP packets (control and data) use the CAPWAP common header 100. As this CAPWAP common header is well-known in the art, it will not be further described. This CAPWAP common header 100 is modified for embodiments described herein as discussed with reference to FIG. 14.

Figure 14:
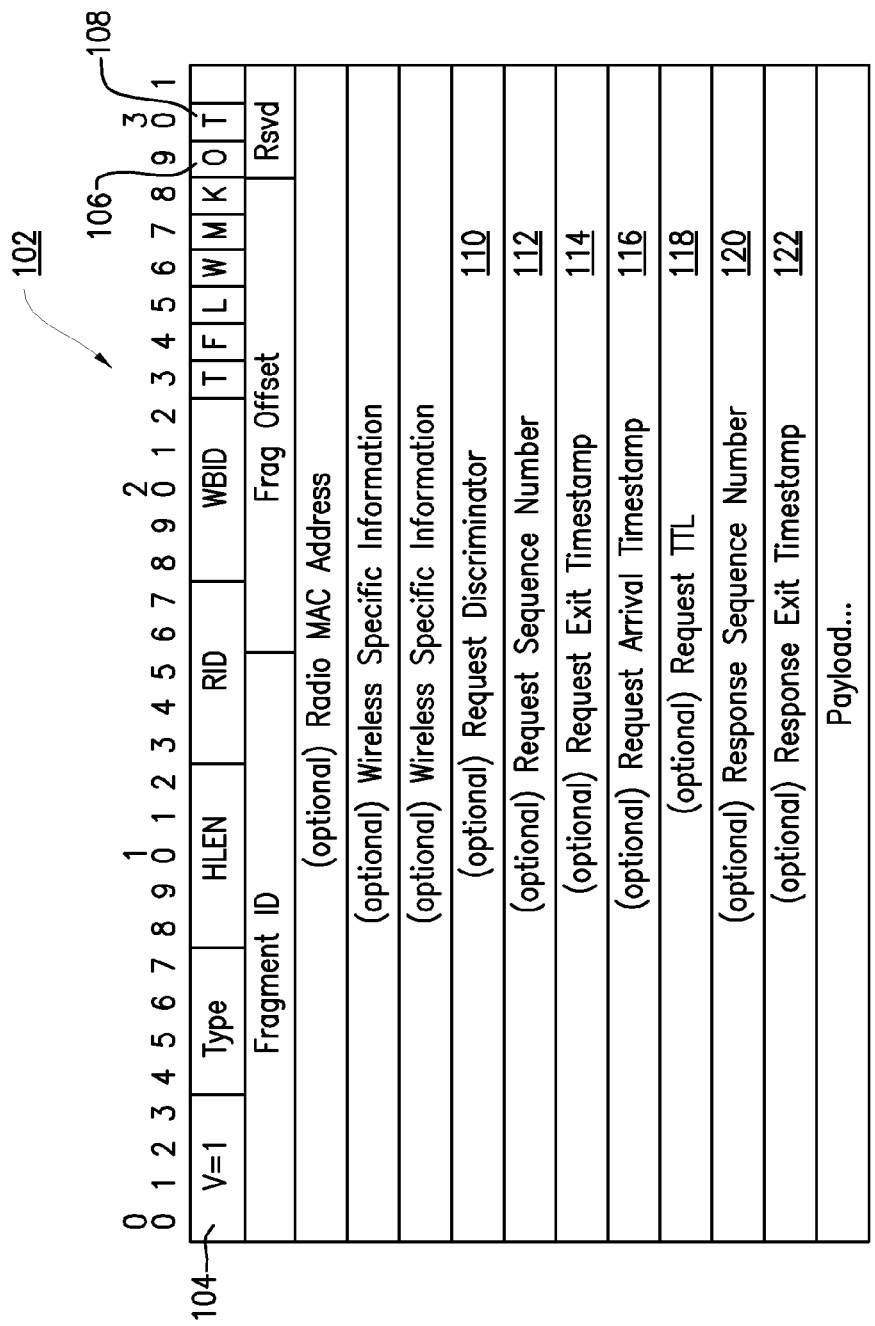
FIG. 14 is a CAPWAP common header configured according to principles of the present invention.

FIG. 14 illustrates a modified exemplary CAPWAP common header 102 according to principles of the present invention. The CAPWAP header 102 is referred to herein as CAPWAP protocol header version 1. The CAPWAP header 102 includes new flags and corresponding fields to enable one-way measurements of the CAPWAP control channels, which include one-way packet loss, one-way packet mis-ordering, one-way packet duplication, one-way packet delay and one-way packet delay variation, and two-way measurements of the CAPWAP control channels, which include two-way packet loss and two-way packet delay. The one-way measurements measure the performance of a packet sent from a first CAPWAP channel endpoint to a second CAPWAP channel endpoint. The two-way measurements measure the performance of a packet sent from the first CAPWAP channel endpoint to the second CAPWAP channel endpoint and coming back to the first CAPWAP channel endpoint from the second CAPWAP channel endpoint.

The 4-bit Version field 104 contains the version of CAPWAP used in a packet. The value for embodiments described below is 1. Values other than one can also be used. Two new flags are introduced in the CAPWAP header 102: O 106 and T 108. The O bit and T bit are defined in the area where the Flags field is defined in protocol version 0. The Flags field is defined in protocol version 0 as a set of reserved bits for future flags. The O and T bits can also be defined in a different field of the header 102.

The O bit 106 is used to specify whether the optional one-way measurement fields are present in the header of a control packets sent by a control channel requester, defined above. When this O bit 106 is set to 1, the following fields are present in the header:
Request Discriminator 110
Request Sequence Number 112
Request Exit Timestamp 114

The Request Discriminator 110, Request Sequence Number 112 and Request Exit Timestamp 114 fields are not present if the O bit 106 is set to 0. They are only present if the O bit 106 is set to 1. The Request Discriminator 110, Request Sequence Number 112 and Request Exit Timestamp 114 fields are populated by the CAPWAP requester.

The Request Discriminator 110 is a 32-bit value that is used by the CAPWAP requester to identify specific control packets belonging to a control channel. The CAPWAP requester should choose a nonzero discriminator value that is unique and meaningful to the CAPWAP requester so that when a response message is received from the CAPWAP responder, the response message can be associated with the specific control packet identified by the CAPWAP requester. Therefore, by using the request discriminator 110, specific packets or messages can be monitored.

The Request Sequence Number 112 is a 32-bit value that is different from the 8-bit Sequence Number field currently defined in the CAPWAP control header for control packets.

The 8-bit Sequence Number field in the control header is an identifier value used to match Request and Response packets. The Request Sequence Number 112 is generated from a packet counter associated with each CAPWAP bi-directional control channel at the CAPWAP requester. The Request Sequence Number 112 starts at zero and is incremented by one for each request packet transmitted on the control channel for a given sender discriminator 110 value. The Request Sequence Number 112 field wraps back to zero when it has reached its upper limit. Request Sequence Number 112 and the Response Sequence Number 120 enable determination of packet mis-ordering and packet loss per channel direction.

The Request Exit Timestamp 114 is a 64-bit value. The Request Exit Timestamp 114 is an approximation of the packet real time of departure from the CAPWAP requester endpoint. The format of the Request Exit Timestamp 114 is the same as in RFC1305 and is as follows: the first 32 bits represent the unsigned integer number of seconds elapsed since 0 h on 1 Jan. 1900; the next 32 bits represent the fractional part of a second that has elapsed since then. The Request Exit Timestamp 114 is used in conjunction with an arrival timestamp generated at the CAPWAP responder to determine packet delay and packet delay variation, for example, by subtracting the Request Exit Timestamp 114 from the Request Arrival Timestamp 116.

The T bit 108 is used to specify whether the optional two-way basic measurement fields are present in the header of a control packet sent by a CAPWAP responder. When this bit is set to 1, the following fields are present in the header:
Request Arrival Timestamp 116
Request TTL 118
Response Sequence Number 120
Response Exit Timestamp 122

The Request Arrival Timestamp 116, Request TTL 118, Response Sequence Number 120 and Response Exit Timestamp 122 fields are not present if the T bit is set to 0. They are only present if the T bit is set to 1. The Request Arrival Timestamp 116, Request TTL 118, Response Sequence Number 120 and Response Exit Timestamp 122 fields are set to zero by the CAPWAP requester and are populated with meaningful values by the CAPWAP responder.

The Request Arrival Timestamp 116 is a 64-bit value. The Request Arrival Timestamp 116 is an approximation of the packet real time of arrival at a CAPWAP channel endpoint. The format of the timestamp is the same as in RFC1305 and is as follows: the first 32 bits represent the unsigned integer number of seconds elapsed since 0 h on 1 Jan. 1900; the next 32 bits represent the fractional part of a second that has elapsed since then. The request arrival timestamp 116 is used in conjunction with the received request exit timestamp 114 to determine packet delay and packet delay variation.

The Request TTL 118 is a 32-bit value, and is the TTL/Hop Limit value in the IPv4/IPv6 header of the received packet. The purpose of the request TTL 118 is to determine the number of IP hops between the CAPWAP requestor of a first CAPWAP node and CAPWAP responder of a second CAPWAP node and whether the control packets in a given direction have been routed on different paths during the lifetime of the control channel. Asymmetric paths can be an indication of a poorly performing network.

The Response Sequence Number 120 is a 32-bit value. The Response Sequence Number 120 is generated from a packet counter associated with each CAPWAP bi-directional control channel at the CAPWAP responder. The Response Sequence Number 120 may start with zero and may be incremented by one or another integer for each packet transmitted on the control channel by the CAPWAP responder. The Response Sequence Number 120 field wraps back to an initial value when it has reached its upper limit. Having a pair of independent sequence numbers, i.e., request sequence number 112 and response sequence number 120 allows the system to detect the transmission direction where control packet loss may occur. This may be accomplished by detecting individual sequence number discontinuities in the Request Sequence Number 112 and the Response Sequence Number 120 and comparing them as needed to determine in which direction the packet loss or mis-ordering has occurred. A purpose of the response sequence number 120 is to enable determination a packet mis-ordering or packet loss. Here again, packet mis-ordering and packet loss are indicators of a poorly performing network.

The Response Exit Timestamp 122 is a 64-bit value. The Response Exit Timestamp 122 is an approximation of the packet real time of departure from the CAPWAP responder endpoint. The format of the Response Exit Timestamp 122 is the same as in RFC1305 and is as follows: the first 32 bits represent the unsigned integer number of seconds elapsed since 0 h on 1 Jan. 1900; the next 32 bits represent the fractional part of a second that has elapsed since then. A purpose of the response exit timestamp is to enable determination of packet delay and packet delay variation.

Figure 15:
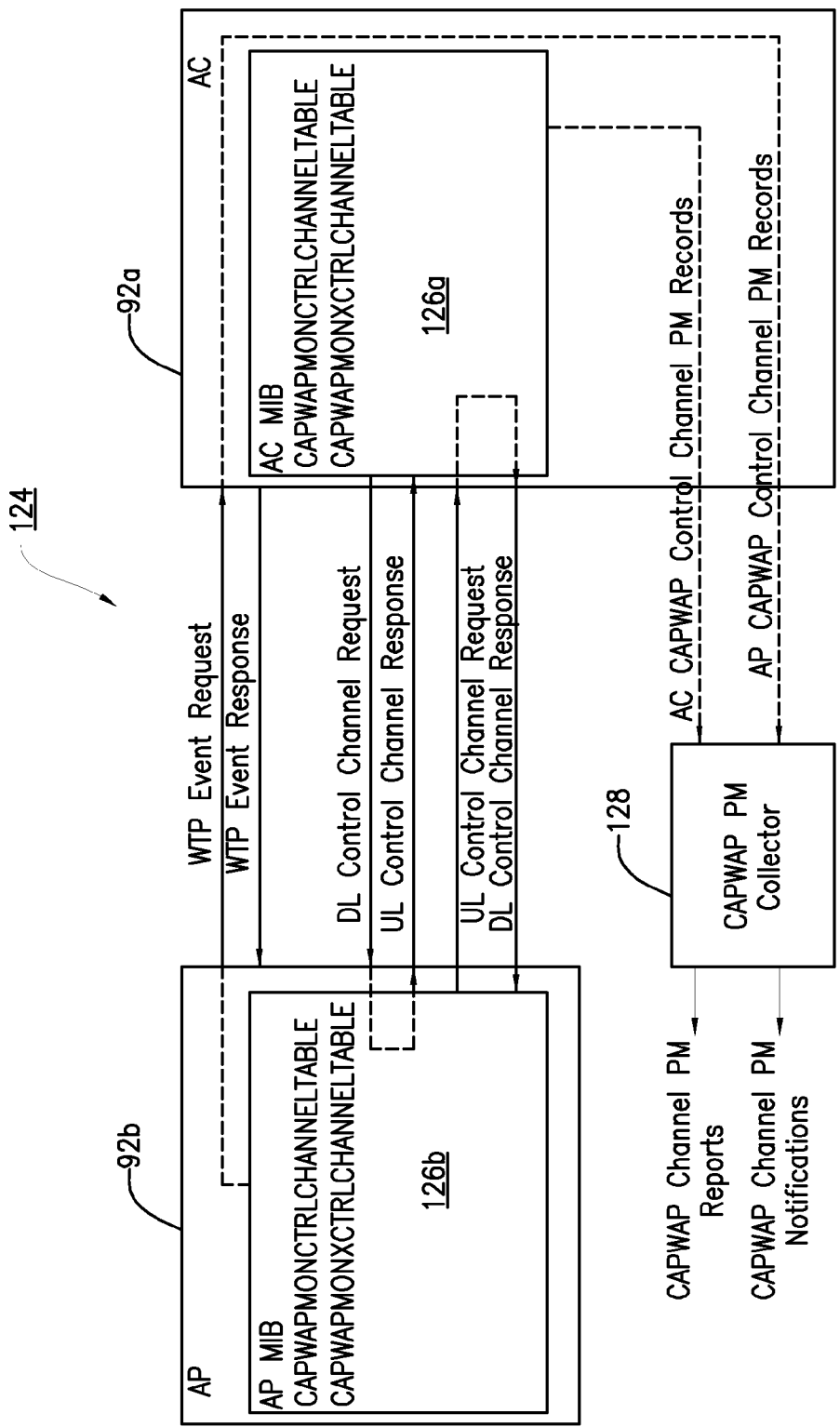
FIG. 15 is a block diagram of a WLAN architecture constructed in accordance with principles of the present invention.

FIG. 15 is a block diagram of an exemplary WLAN architecture 124 having an AC 92a simultaneously acting as both a CAPWAP bi-directional control channel requester and responder, and an AP 92b, also simultaneously acting as both a CAPWAP bi-directional control channel requester and responder. Embodiments include new management information bases, MIBs 126a and 126b to capture data such as configuration attributes, properties and statistics for CAPWAP bi-directional control channels. A MIB constructed in accordance with the present invention is referred to as a CAPWAP Monitoring MIB, and is composed of the following tables:
    capwapMonCtrlChannelTable
    capwapMonXCtrlChannelTable The capwapMonCtrlChannelTable is a table of objects that display properties and endpoint statistics for the CAPWAP bi-directional control channels. The table includes a sequence of entries denoted as capwapMonCtrlChannelEntry, where each entry corresponds to a CAPWAP bi-directional control channel. This table is applicable for existing CAPWAP protocol versions (CAPWAP version 0) and new CAPWAP protocol versions (CAPWAP version 1) for both AP and AC. Each capwapMonCtrlChannelEntry is composed of a sequence of objects as follows:
    capwapMonCtrlChannelEntry ::=SEQUENCE {
    capwapMonCtrlChannelId (CAPWAP session identifier)
    capwapMonCtrlChannelRowStatus (active, notInService)
    capwapMonCtrlChannelCurrentState
    capwapMonCtrlChannelLastStateChange (timestamp)
    capwapMonCtrlChannelIpType (ipv4, ipv6)
    capwapMonCtrlChannelTransport (udp, udp-lite)
    capwapMonCtrlChannelWtpIpAddress
    capwapMonCtrlChannelAcIpAddress
    capwapMonCtrlChannelWtpPort
    capwapMonCtrlChannelAcPort
    capwapMonCtrlChannelProtocolVersion (0, 1)
    capwapMonCtrlChannelOutRequests (counter64)
    capwapMonCtrlChannelOutResponses (counter64)
    capwapMonCtrlChannelOutOctets (counter64)
    capwapMonCtrlChannelOutOctetSumOfSquares (counter64)
    capwapMonCtrlChannelOutRtxRequests (counter32)
    capwapMonCtrlChannelOutMinTotalLength (gauge32)
    capwapMonCtrlChannelOutMaxTotalLength (gauge32)
    capwapMonCtrlChannelInRequests (counter64)
    capwapMonCtrlChannelInResponses (counter64)
    capwapMonCtrlChannelInOctets (counter64)
    capwapMonCtrlChannelInOctetSumOfSquares (counter64)
    capwapMonCtrlChannelInDiscards (counter32)
    capwapMonCtrlChannelInErrors (counter32)
    capwapMonCtrlChannelInMinTotalLength (gauge32)
    capwapMonCtrlChannelInMaxTotalLength (gauge32)
    capwapMonCtrlChannelInMinTtl (gauge32)
    capwapMonCtrlChannelInMaxTtl (gauge32)
    capwapMonCtrlChannelInMinDscp (gauge32)
    capwapMonCtrlChannelInMaxDscp (gauge32)}

The capwapMonXCtrlChannelTable is a table of objects that contain and configure and two-way packet delay and loss statistics and alarm thresholds for the CAPWAP bi-one-way directional control channels. One way statistics are applicable for a specific direction of the control channel, whereas two way statistics are round-trip statistics including both the uplink and the downlink directions. The table includes a sequence of entries denoted as capwapMonXCtrlChannelEntry, where each entry corresponds to a CAPWAP bi-directional control channel. This table is applicable for the new CAPWAP protocol version (CAPWAP version 1) for both AP and AC. Each capwapMonXCtrlChannelEntry entry is composed of a sequence of objects as follows:
    capwapMonXCtrlChannelEntry ::=SEQUENCE {
    capwapMonXCtrlChannelId (CAPWAP session identifier)
    capwapMonXCtrlChannelRowStatus (active, notInService)
    capwapMonXCtrlChannelOutRequestLosts (counter32)
    capwapMonXCtrlChannelOutMinRequestDelay (gauge32)
    CapwapMonXCtrlChannelOutMaxRequestDelay (gauge32)
    capwapMonXCtrlChannelOut50PercentileRequestDelay (gauge32)
    capwapMonXCtrlChannelOut95PercentileRequestDelay (gauge32)
    capwapMonXCtrlChannelInResponseLoss (counter32)
    capwapMonXCtrlChannelInResponseDuplicates (counter32)
    capwapMonXCtrlChannelInResponseTooLates (counter32)
    capwapMonXCtrlChannelInMinResponseDelay (gauge32)
    capwapMonXCtrlChannelInMaxResponseDelay (gauge32)
    capwapMonXCtrlChannelIn50PercentileResponseDelay (gauge32)
    capwapMonXCtrlChannelIn95PercentileResponseDelay (gauge32)
    capwapMonXCtrlChannelMinTwoWayDelay (gauge32)
    capwapMonXCtrlChannelMaxTwoWayDelay (gauge32)
    capwapMonXCtrlChannelAverageTwoWayDelay (gauge32)
    capwapMonXCtrlChannelOutRequestMinTtl (gauge32)
    capwapMonXCtrlChannelOutRequestMaxTtl (gauge32)
    capwapMonXCtrlInResponseLossNotifyEnable (true, false)
    capwapMonXCtrlInHighResponseLoss (notification)
    capwapMonXCtrlInNormalResponseLoss (notification)
    capwapMonXCtrlTwoWayDelayNotifyEnable (true, false)
    capwapMonXCtrlHighTwoWayDelay(notification)
    capwapMonXCtrlNormalTwoWayDelay(notification)}

In operation, a CAPWAP PM collector 128 collects and stores the AC and AP CAPWAP PM records from the MIB databases 126a and 126b. Performance records may be a sequence of values corresponding to the objects defined in the capwapMonCtrlChannelTable and capwapMonXCtrlChannelTable carried in a file using extensible markup language (XML) format. For example, the performance records could be the metrics such as one-way and/or two-way packet loss, packet mis-ordering, packet duplicate statistics, packet delay, packet delay variation, etc. Those metrics are obtained through the processing of parameters such as the Request Sequence Number 112, the Response Sequence Number 120, the Request Arrival timestamp 116, the Request Exit timestamp 114 and the Response Exit timestamp 122 contained in the request messages or responses messages. Generally, the CAPWAP channel requester does this processing to obtain the different metrics and sends them to the CAPWAP PM collector 128, which stores the metrics in the MIB database 126a and 126b as performance records for the CAPWAP bi-directional control channel. Optionally, in a case where the CAPWAP channel requester is not able to process the parameters contained in the request and response messages, the CAPWAP channel requester can send the raw data, i.e., the values of the parameters as they are, to the CAPWAP PM collector 128, which will then process them in order to obtain the performance metrics or data for the CAPWAP bi-directional channel. The CAPWAP PM collector 128 also correlates the statistics for CAPWAP requests originating from the AP and CAPWAP requests originating from the AC. For example, the one-way downlink packet loss measured by the AC can be compared with or added to the one-way downlink packet loss measured by the AP. The CAPWAP PM collector 128 performs the statistical analysis and produces the performance reports for the CAPWAP bi-directional control channels, based on the records from the MIB databases 126a and 126b.

A CAPWAP PM record can also contain a notification or alarm. When performance degradation has been detected for a specific channel based on the performance data, the AC or AP may send a notification to the CAPWAP PM collector 128. The CAPWAP PM collector 128 may store the alarm or relay a notification to a simple network management protocol (SNMP) trap listener. In some embodiments, a CAPWAP PM collector 128 is a dedicated device or a network management node. It can also be an AC.

Embodiments include extensions to the CAPWAP bi-directional control channel to enable the AP to send the CAPWAP endpoint statistics, one-way statistics, two-way statistics and/or performance degradation notifications for its CAPWAP bi-directional control channel to the AC acting as a CAPWAP PM collector or as AP CAPWAP PM record forwarder.

Embodiments build on the Wireless Transaction Protocol (WTP) Event Request defined in RFC 5415. The WTP event request is defined as a control message for the purpose of sending information including AP radio and CAPWAP control channel statistics from the AP to the AC. The WTP Event Request message may be sent periodically at the end of predefined PM collection interval and is sent in response to performance criteria surpassing a configurable threshold (e.g., send a notification if control packet loss is above 2% for more than 10 minutes).

One or more of the following new message elements are contained in a WTP Event Request message originating from the AP:

WTP Control Channel Basic Statistics
WTP Control Channel Advanced Statistics

The WTP Control Channel Basic Statistics message element is sent by the AP to the AC to communicate properties and endpoint statistics for its CAPWAP bi-directional control channel defined in the capwapMonCtrlChannelTable. The WTP Control Channel Advanced Statistics message element is sent by the AP to the AC to communicate one-way and two-way delay and loss statistics as well as performance degradation notification for its CAPWAP bi-directional control channel defined in the capwapMonXCtrlChannelTable.

The AP CAPWAP control statistics can also be carried in one or more Vendor Specific Payloads, such as message elements defined in RFC 5415 where a unique 16-bit Element identifier is assigned to each group of statistics.

An exemplary process for determining end-to-end performance of a CAPWAP bi-directional control channel is described with reference to FIGS. 15 and 16. A CAPWAP bi-directional control channel is established between two nodes (block S116), for example the AP and AC of FIG. 15. A first CAPWAP channel endpoint 92b sends an outgoing request message on the CAPWAP bi-directional control channel to a CAPWAP channel endpoint 92a at an opposite end of the CAPWAP bi-directional control channel (block S118). The request message may have at least one of an outgoing request sequence number, an outgoing request exit timestamp and/or an outgoing request discriminator. The second CAPWAP channel endpoint 92a assigns an incoming request arrival timestamp and an incoming request time to live (TTL) to the received request message (block S120). In response to the received request message from the first CAPWAP channel endpoint 92b, the second CAPWAP channel endpoint 92a sends a response message to the first CAPWAP channel endpoint 92b (block S122). The response message may include the request arrival time based on the request arrival timestamp, the TTL, a response sequence number and a response exit timestamp. Upon receipt of the response message, the first CAPWAP channel endpoint 92b also assigns an arrival timestamp to the response message received from the CAPWAP channel endpoint 92a (block S124) and determines and/or updates performance data of the CAPWAP bi-directional control channel, from its point of view, for each of the two directions, i.e., the uplink direction and the downlink direction (block S126).

Furthermore, the converse process may be performed by and with respect to the second CAPWAP channel endpoint 92a. In this case, the requester node shown in FIG. 16 is the second CAPWAP channel endpoint 92a and the responder node shown in FIG. 16 is the first CAPWAP channel endpoint 92b. For ease of understanding, reference to the converse process is made with reference to the blocks in FIG. 16 discussed above. A request message sent from the second CAPWAP channel endpoint 92a may be received on the CAPWAP bi-directional control channel by the first CAPWAP channel endpoint 92b (block S118). The incoming request message may be assigned an incoming request arrival timestamp and an incoming request time to live (TTL) (block S120). The first CAWAP channel endpoint 92b sends an outgoing response message on the CAPWAP bi-directional control channel in response to the request messages received from the CAPWAP channel endpoint 92a (block S122). The outgoing response message has at least one of an outgoing response sequence number, an outgoing response exit timestamp and possibly, performance related fields from a corresponding request message. The second CAPWAP channel endpoint 92a also assigns an arrival timestamp to the response message received from the first CAPWAP channel endpoint 92b (block S124) and determines and/or updates performance data of the CAPWAP bi-directional control channel for each of the two directions, i.e. the uplink direction and the downlink direction (block S126).

It should be noted that a given CAPWAP channel endpoint acting as requester may measure and calculate both the one-way and two-way performance metrics/data on its own based on the response messages (or lack of) provided by the responder CAPWAP channel endpoint, in response to the request messages from the CAPWAP channel requester. When both CAPWAP channel endpoints are simultaneously acting as requester and responder, each CAPWAP channel requester endpoint will measure the performance of the channel from its point-of-view and the CAPWAP PM collector 128 is configured to aggregate the performance data/records to get an overall view of the CAPWAP bi-directional channel performance.

Figure 16:
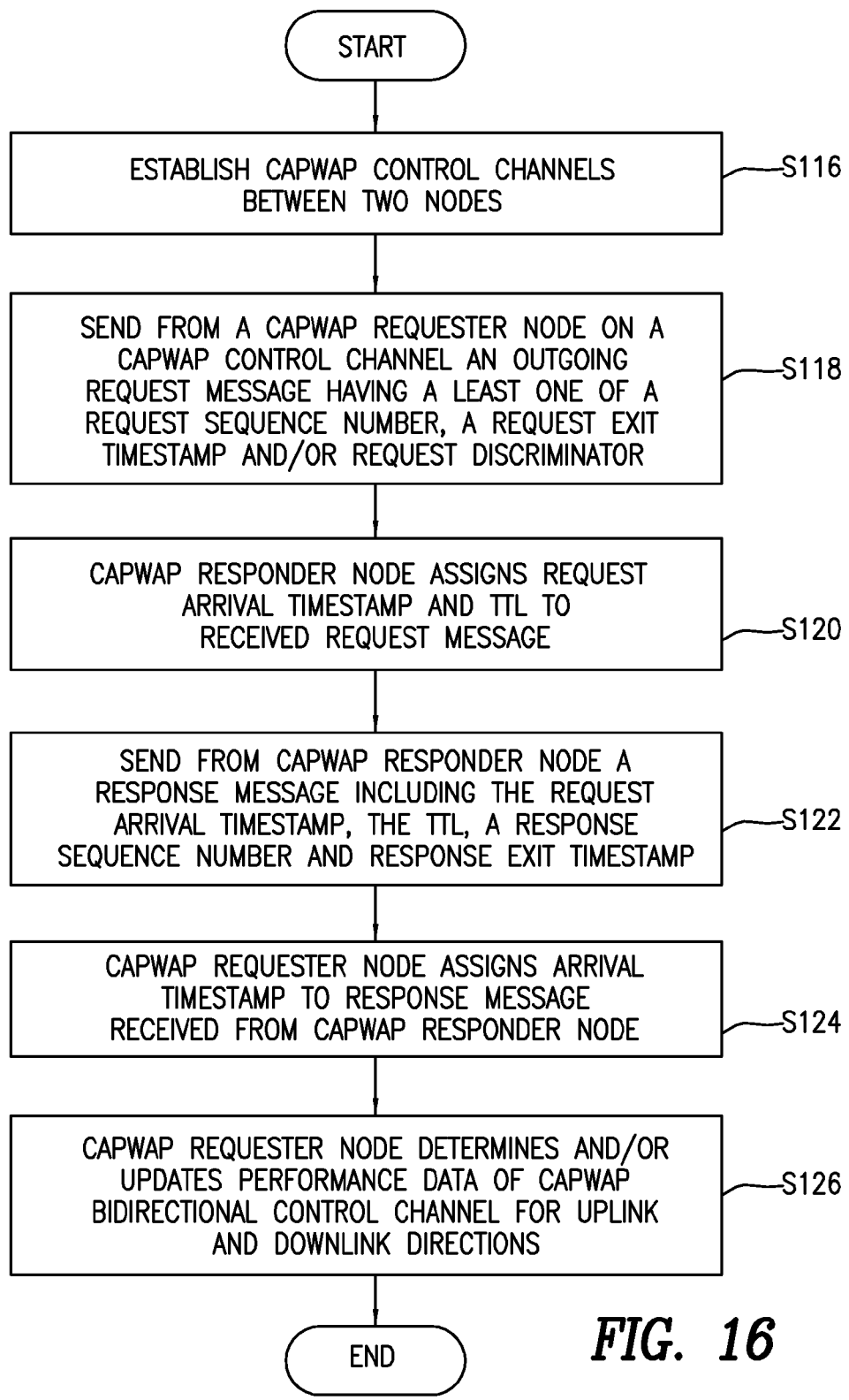
FIG. 16 is a flowchart of an exemplary process for determining end-to-end performance of a CAPWAP bi-directional control channel.

Thus, in the exemplary process of FIG. 16, the CAPWAP channel endpoint 92b sends request messages, receives request messages and sends response messages. Similarly, the CAPWAP channel endpoint 92a also sends request messages, receives request messages and sends response messages. The request messages have exit timestamps and arrival timestamps. Similarly, the response messages have exit timestamps and arrival timestamps. The exit timestamps and the arrival timestamps enable determination of a second set of one-way performance data for each direction of the CAPWAP bi-directional control channel. The second set of one-way performance data for a given direction may include at least one of one-way packet delay and packet delay variation statistics. The data collected by the MIBs 126a and 126b resulting from the use/monitoring of the bi-directional control channels associated with CAPWAP channel endpoints 92a and 92b may be aggregated by CAPWAP PM collector 128 for report generation, alarms and notifications, etc.

An example of the relative timing of the process of FIG. 16 along with the collection and transmission of performance monitoring records to a performance monitoring collector is described with reference to FIG. 17. Initially, the bi-directional CAPWAP control channel of block S116 is established between the CAPWAP requester 92b and the CAPWAP responder 92a. An outgoing request message, such as described with respect to block S118, is sent from the CAPWAP requester 92b to the CAPWAP responder 92a using the CAPWAP bi-directional control channel. The control message could be, for example, a Configuration Status Request message that includes the appropriate request field, and at least one of a request sequence number, a request for exit timestamp and/or the request discriminator.

CAPWAP responder 92a receives the Configuration Status Request message, assigns the request arrival timestamp and TTL as set out in block S120, and sends the response message of block S122 to CAPWAP requester 92b as set out in block S122. In this example, the response message is a Configuration Status Response that includes configuration data of CAPWAP responder 92a, the request sequence number, request exit timestamp and/or request discriminator from the CAPWAP requester 92b, and the request arrival timestamp, TTL, response sequence number and response timestamp from the CAPWAP responder 92a.

CAPWAP requester 92b receives the Configuration Status Response message and assigns an arrival timestamp in accordance with block S124. CAPWAP requestor 92b then updates its control channel statistics and/or tables to reflect the received and/or calculated information. The statistical data or other information determined based on the received response message may be collected and/or updated over a period of time, e.g., 15 minutes (block S126). PM records with this statistical data and information can then be transmitted to the CAPWAP PM collector 128. Although FIG. 17 shows the CAPWAP requester 92b transmitting the PM records to the CAPWAP PM collector 128 via an intermediate node, such as the CAPWAP responder 92a, the invention is not limited solely to this arrangement. It is contemplated that the CAPWAP requester 29b can transmit the PM records directly to the CAPWAP PM collector 128.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A system for enabling collection of end-to-end performance information for a Control And Provisioning of Wireless Access Points, CAPWAP, bi-directional control channel established between first and second CAPWAP nodes, the system comprising:
   a first CAPWAP channel endpoint in the first CAPWAP node, the first CAPWAP channel endpoint configured to provide a first plurality of sequence numbers in request messages on the CAPWAP bi-directional control channel, the first CAPWAP channel endpoint being further configured to provide a request discriminator in a request message to selectively identify particular control messages to be performance monitored;
   a second CAPWAP channel endpoint in the second CAPWAP node, the second CAPWAP channel endpoint configured to send a second plurality of sequence numbers in response messages on the CAPWAP bi-directional control channel in response to the request messages;
   the first and second plurality of sequence numbers enabling determination of a first set of one-way performance data for each of two directions of the CAPWAP bi-directional control channel.

2. The system of claim 1, wherein the response messages include the first and second plurality of sequence numbers.

3. The system of claim 1, wherein:
   the first CAPWAP channel endpoint is further configured to:
      provide a first plurality of exit timestamps in the request messages;
      receive the response messages from the second CAPWAP channel endpoint; and
      provide a first plurality of arrival timestamp for the received response messages; and
   the second CAPWAP channel endpoint is further configured to:
      receive the request messages from the first CAPWAP channel endpoint;
      provide a second plurality of arrival timestamps for the received request messages; and
      provide a second plurality of exit timestamps in the response messages;
   the first and second plurality of exit timestamps and arrival timestamps enabling determination of a second set of one-way performance data for each direction of the CAPWAP bi-directional control channel.

4. The system of claim 3, wherein the second set of one-way performance data for a given direction includes at least one of one-way packet delay and packet delay variation statistics.

5. The system of claim 1, wherein the first set of one-way performance data for a given direction includes at least one of one-way packet loss, packet mis-ordering, and packet duplicate statistics.

6. The system of claim 1, further comprising:
a performance monitor, PM, collector in communication with the first CAPWAP channel endpoint and configured to collect the first set of one-way performance data from the first CAPWAP channel endpoint.

7. The system of claim 6, wherein the collected first one-way performance data is contained in a CAPWAP control message when the CAPWAP requester is a WiFi access point.

8. The system of claim 1, further comprising:
the first CAPWAP channel endpoint acting as one of a Wi-Fi access point and a Wi-Fi access controller.

9. The system of claim 1, further comprising:
the second CAPWAP channel endpoint acting as one of a Wi-Fi access point and a Wi-Fi access controller.

10. The system of claim 1 wherein the response messages and corresponding second plurality of sequence numbers received from the second CAPWAP channel endpoint are contained in a table establishing delay and loss statistics for the CAPWAP bi-directional control channel.

11. A system for enabling collection of end-to-end performance information for a Control And Provisioning of Wireless Access Points, CAPWAP, bi-directional control channel established between first and second CAPWAP nodes, the system comprising:
a first CAPWAP channel endpoint in the first CAPWAP node, the first CAPWAP channel endpoint (92a) configured to send a first plurality of sequence numbers in response messages on the CAPWAP bi-directional control channel, the first CAPWAP channel endpoint being further configured to provide a request discriminator in a request message to selectively identify particular control messages to be performance monitored, the response messages being sent in response to received request messages, the first plurality of sequence numbers enabling determination of a set of one-way performance data for a first direction of the CAPWAP bi-directional control channel.

12. The system of claim 11, further comprising a second CAPWAP channel endpoint in the second CAPWAP node, the second CAPWAP channel endpoint configured to provide a second plurality of sequence numbers in the request messages, the second plurality of sequence numbers enabling determination of a set of one-way performance data for a second direction of the CAPWAP bi-directional control channel.

13. The system of claim 12, wherein the first CAPWAP channel endpoint is further configured to receive a request message from a remote CAPWAP channel endpoint, and to assign an arrival timestamp to the received request message.

14. The system of claim 11, wherein the response messages further include an arrival timestamp, the arrival timestamp indicating a time at which the request message is received by the first CAPWAP channel endpoint.

15. The system of claim 14, wherein the response messages further include an exit timestamp indicating a time at which the response message is transmitted by the first CAPWAP channel endpoint.

16. The system of claim 11, wherein a sequence number indicates an order in which the response message is transmitted.

17. The system of claim 11, wherein the second CAPWAP channel endpoint is one of a Wi-Fi access point and a Wi-Fi access controller.

18. A method of collecting end-to-end performance information for a Control And Provisioning of Wireless Access Points, CAPWAP, bi-directional control channel established between first and second CAPWAP nodes, the method comprising:
sending from a first CAPWAP channel endpoint of the first CAPWAP node outgoing request messages on the CAPWAP bi-directional control channel, the outgoing request messages having first sequence numbers a request messages having a request discriminator to selectively identify particular control messages to be performance monitored; and
sending from a second CAPWAP channel endpoint of the second CAPWAP node outgoing response messages on the CAPWAP bi-directional control channel, the outgoing response messages having second sequence numbers and being sent in response to the request messages;
the first and second sequence numbers enabling determination of a first set of one-way performance data for each of two directions of the CAPWAP bi-directional control channel.

19. The method of claim 18, further comprising:
providing via the first CAPWAP channel endpoint a first plurality of exit timestamps in the request messages;
receiving via the first CAPWAP channel endpoint the response messages from the second CAPWAP channel endpoint;
providing via the first CAPWAP channel endpoint a first plurality of arrival timestamps for the received response messages;
receiving via the second CAPWAP channel endpoint the request messages from the first CAPWAP channel endpoint;
providing via the second CAPWAP channel endpoint a second plurality of arrival timestamps for the received request messages; and
providing via the second CAPWAP channel endpoint a second plurality of exit timestamps in the response messages;
the first and second plurality of exit timestamps and arrival timestamps enabling determination of a second set of one-way performance data for each direction of the CAPWAP bi-directional control channel.

20. The method of claim 19, wherein the second set of one-way performance data for a given direction includes at least one of one-way packet delay and packet delay variation statistics.

21. The method of claim 19, wherein the response messages further include an exit timestamp indicating a time at which a response message is transmitted by the second CAPWAP channel endpoint.

22. The method of claim 19, wherein the response messages further include an arrival timestamp, the arrival timestamp indicating a time at which a request message is received by the second CAPWAP channel endpoint.

23. The method of claim 17, wherein the response message includes the first sequence numbers and the second sequence numbers.

* * * * *

UNITED STATES PATENT AND TRADEMARK OFFICE
CERTIFICATE OF CORRECTION

| | | |
|---|---|---|
| PATENT NO. | : 9,338,678 B2 | |
| APPLICATION NO. | : 14/017950 | |
| DATED | : May 10, 2016 | |
| INVENTOR(S) | : Baillargeon | |

It is certified that error appears in the above-identified patent and that said Letters Patent is hereby corrected as shown below:

In the specification,

In Column 19, Line 61, delete "configure and" and insert -- configure one-way and --, therefor.

In Column 19, Lines 62-63, delete "bi-one-way directional" and insert -- bi-directional --, therefor.

In the claims,

In Column 25, Line 19, in Claim 10, delete "claim 1" and insert -- claim 1, --, therefor.

In Column 25, Line 30, in Claim 11, delete "endpoint 92a" and insert -- endpoint --, therefor.

In Column 26, Line 12, in Claim 18, delete "numbers" and insert -- numbers, --, therefor.

Signed and Sealed this
Second Day of August, 2016

Michelle K. Lee
*Director of the United States Patent and Trademark Office*